US010665236B2

(12) United States Patent
Kothari et al.

(10) Patent No.: US 10,665,236 B2
(45) Date of Patent: *May 26, 2020

(54) DIGITAL ASSISTANT PROCESSING OF STACKED DATA STRUCTURES

(71) Applicant: Google LLC, Mountain View, CA (US)

(72) Inventors: Anshul Kothari, Cupertino, CA (US); Tarun Jain, Los Altos, CA (US); Gaurav Bhaya, Sunnyvale, CA (US); Lisa Takehana, Santa Monica, CA (US); Ruxandra Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/966,940

(22) Filed: Apr. 30, 2018

(65) Prior Publication Data
US 2019/0180742 A1 Jun. 13, 2019

Related U.S. Application Data

(63) Continuation-in-part of application No. 15/771,613, filed as application No. PCT/US2017/065464 on Dec. 8, 2017, now Pat. No. 10,580,412.

(51) Int. Cl.
*G10L 15/00* (2013.01)
*G10L 15/22* (2006.01)
(Continued)

(52) U.S. Cl.
CPC .......... *G10L 15/22* (2013.01); *G10L 15/1822* (2013.01); *G10L 17/22* (2013.01);
(Continued)

(58) Field of Classification Search
CPC ........ G10L 15/22; G10L 17/005; G06F 16/27
See application file for complete search history.

(56) References Cited

U.S. PATENT DOCUMENTS 5,872,850 A 2/1999 Klein et al.
6,055,637 A 4/2000 Hudson et al.
(Continued)

OTHER PUBLICATIONS

"Walmart and Google to offer voice-enabled shopping", BBC News, Aug. 23, 2017 (10 pages).
(Continued)

*Primary Examiner* — Daniel Abebe
(74) *Attorney, Agent, or Firm* — Foley & Lardner LLP; James De Vellis

(57) ABSTRACT

Processing stacked data structures is provided. A system receives an input audio signal detected by a sensor of a local computing device, identifies an acoustic signature, and identifies an account corresponding to the signature. The system establishes a session and a profile stack data structure including a first profile layer having policies configured by a third-party device. The system pushes, to the profile stack data structure, a second profile layer retrieved from the account. The system parses the input audio signal to identify a request and a trigger keyword. The system generates, based on the trigger keyword and the second profile layer, a first action data structure compatible with the first profile layer. The system provides the first action data structure for execution. The system disassembles the profile stack data structure to remove the first profile layer or the second profile layer from the profile stack data structure.

20 Claims, 7 Drawing Sheets

(51) Int. Cl.
*G10L 15/18* (2013.01)
*G10L 17/22* (2013.01)
*H04W 12/06* (2009.01)
*G10L 15/08* (2006.01)
*G10L 15/30* (2013.01)

(52) U.S. Cl.
CPC .............. *H04W 12/06* (2013.01); *G10L 15/30* (2013.01); *G10L 2015/088* (2013.01)

(56) References Cited

U.S. PATENT DOCUMENTS

| | | | |
|---|---|---|---|
| 6,088,679 | A | 7/2000 | Barkley |
| 9,493,130 | B2 | 11/2016 | Penilla et al. |
| 10,157,042 | B1 * | 12/2018 | Jayakumar .............. G10L 15/22 |
| 10,380,208 | B1 | 8/2019 | Brahmbhatt et al. |
| 10,418,026 | B2 * | 9/2019 | Des Jardins .......... G10L 15/005 |
| 2002/0034280 | A1 | 3/2002 | Infosino |
| 2014/0222436 | A1 | 8/2014 | Binder et al. |
| 2017/0092278 | A1 | 3/2017 | Evermann et al. |
| 2017/0099295 | A1 | 4/2017 | Ricci |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0133012 | A1 | 5/2017 | Ho et al. |
| 2017/0358301 | A1 | 12/2017 | Raitio et al. |

OTHER PUBLICATIONS

Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5F C5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chamberlain, "How Marriott Plans to Use Amazon Alexa to Improve the In-Room Experience for Guests", GeoMarketing, Oct. 2, 2017, 5 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).

Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 ( 4 pages).
Google Inc., Products Feed Specification, printed from Internet address: http://www.support.google.com/merchants/bin/answer.py?h1=en&answer=188494#US, on Mar. 18, 2013, 6 pages.
Google Inc., Supported File Formats, printed from Internet address: http://www.support.google.com/merchants/bin/answer.py?h1=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion for PCT Appl. Ser. No. PCT/US2017/065464 dated Apr. 18, 2018 (20 pages).
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, "Take Two for Samsung's troubled Bixby assistant", BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Mohani, "Radisson Hotel gets Amazon Alexa-enabled smart rooms", Gadgets Now, Jan. 15, 2018, 5 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.

(56) References Cited

OTHER PUBLICATIONS

Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Yu et al., "Siri and Alexa Are Fighting to Be Your Hotel Butler", Bloomberg, Mar. 22, 2017, 6 pages.
Foreign Action other than Search Report on KR 10-2018-7014244, dated Jun. 30, 2019, 29 pages.
Notice of Allowance for U.S. Appl. No. 15/771,613 dated Oct. 30, 2019 (9 pages).

\* cited by examiner

DIGITAL ASSISTANT PROCESSING OF STACKED DATA STRUCTURES

CROSS-REFERENCES TO RELATED APPLICATIONS

This application claims the benefit of priority under 35 U.S.C. § 120 as a continuation-in-part of U.S. patent application Ser. No. 15/771,613, filed Apr. 27, 2018, which is a U.S. National Stage under 35 U.S.C. § 371 of International Patent Application No. PCT/US2017/065464, filed Dec. 8, 2017 and designating the United States, each of which are hereby incorporated by reference herein in their entirety.

BACKGROUND

Computing devices located in a public space may be unsecure. Various entities may access or utilize the public computing device. As different entities access or utilize the public computing device, it may be challenging to accurately process remote procedure calls, applications, or scripts for a specific entity due to ambiguities associated with policies for the different entities, thereby causing erroneous network transmissions, application calls, and remote procedure calls leading to wasted network and processing resources.

SUMMARY

The present disclosure is generally directed to processing stacked data structures to improve the efficiency of a digital assistant in a public location. A data processing system can perform speaker recognition to identify an electronic account, and then push a profile associated with the speaker to a profile stack data structure that includes a first layer having a baseline profile established by a third-party entity associated with the public location. The data processing system can disassemble the profile stack data structure responsive to a trigger event, thereby maintaining security and reducing erroneous remote procedure calls.

At least one aspect is directed to a system to process stacked data structures. The system can include a data processing system having one or more processors and memory to execute a natural language processor component, an interface, a speaker recognition component, and a direct action application programming interface. The interface can receive data packets including an input audio signal detected by a sensor of a local computing device. The data processing system can identify an acoustic signature from the input audio signal. The data processing system can identify, based on a lookup in a data repository, an electronic account corresponding to the acoustic signature. The data processing system can establish, responsive to identification of the electronic account, a session and a profile stack data structure for use in the session. The profile stack data structure can include a first profile layer having one or more policies configured by a device of a third-party entity. The data processing system can push, to the profile stack data structure established for the session, a second profile layer retrieved from the account. The data processing system can parse the input audio signal to identify a request and a trigger keyword corresponding to the request. The data processing system can generate, based on the trigger keyword and the second profile layer pushed to the profile stack data structure, a first action data structure responsive to the request that is compatible with the first profile layer of the profile stack data structure. The data processing system can provide the first action data structure for execution. The data processing system can disassemble, responsive to detection of a trigger event, the profile stack data structure to remove one of the first profile layer or the second profile layer from the profile stack data structure.

At least one aspect is directed to a method of processing stacked data structures. The method can be performed by a data processing system having one or more processors and memory. The method can include an interface of the data processing system receiving data packets including an input audio signal detected by a sensor of a local computing device. The method can include the data processing system identifying an acoustic signature from the input audio signal. The method can include the data processing system identifying, based on a lookup in a data repository, an electronic account corresponding to the acoustic signature. The method can include the data processing system establishing, responsive to identification of the electronic account, a session and a profile stack data structure for use in the session. The profile stack data structure can include a first profile layer having one or more policies configured by a device of a third-party entity. The method can include the data processing system pushing, to the profile stack data structure established for the session, a second profile layer retrieved from the account. The method can include the data processing system parsing the input audio signal to identify a request and a trigger keyword corresponding to the request. The method can include the data processing system generating, based on the trigger keyword and the second profile layer pushed to the profile stack data structure, a first action data structure responsive to the request that is compatible with the first profile layer of the profile stack data structure. The method can include the data processing system providing the first action data structure for execution. The method can include the data processing system disassembling, responsive to detection of a trigger event, the profile stack data structure to remove one of the first profile layer or the second profile layer from the profile stack data structure.

At least one aspect is directed to a digital assistant device. The digital assistant device can include an audio driver, a transducer, a sensor to detect an input audio signal, and a pre-processor component coupled to the audio driver, the transducer, and the sensor. The pre-processor component can filter the input audio signal to create a filtered input audio signal. The pre-processor component can convert the filtered input audio signal to data packets. The pre-processor component can transmit the data packets to a data processing system comprising one or more processors and memory that execute a natural language processor component, an interface, a speaker recognition component, and a direct action application programming interface. The data processing system can receive, via the interface, from the pre-processor component, the data packets comprising the filtered input audio signal detected by the sensor. The data processing system can identify an acoustic signature from the input audio signal. The data processing system can identify, based on a lookup in a data repository, an electronic account corresponding to the acoustic signature. The data processing system can establish, responsive to identification of the electronic account, a session and a profile stack data structure for use in the session. The profile stack data structure can include a first profile layer having one or more policies configured by a device of a third-party entity. The data processing system can push, to the profile stack data structure established for the session, a second profile layer retrieved from the electronic account. The data processing system can parse the input audio signal to identify a request and a trigger keyword corresponding to the request. The data processing system can generate, based on the trigger keyword and the second profile layer pushed to the profile stack data structure, a first action data structure responsive to the request that is compatible with the first profile layer of the profile stack data structure. The data processing system can provide the first action data structure for execution. The data processing system can disassemble, responsive to detection of a trigger event, the profile stack data structure to remove one of the first profile layer or the second profile layer from the profile stack data structure. The data processing system can provide, to the pre-processor component, a status of the profile stack data structure. The audio drive of the digital assistant device can further receive an indication of the status of the profile stack data structure, and generate an output signal based on the indication. The transducer of the digital assistant device can further generate sound based on the output signal generated by the audio drive.

At least one aspect is directed to a system to process stacked data structures. The system can include a data processing system. The data processing system can include one or more processors and memory. The data processing system can execute a natural language processor component, an interface, a speaker recognition component, and a direct action application programming interface. The data processing system can receive, via the interface, data packets comprising an input audio signal detected by a sensor of a local computing device. The data processing system can establish a session with a profile stack data structure for use in the session. The profile stack data structure can include a first profile layer having one or more policies. The data processing system can identify, based on a lookup in a data repository, an electronic account corresponding to the data packets. The electronic account can include a second profile layer. The data processing system can add, to the profile stack data structure established for the session, a second profile layer associated retrieved from the electronic account. The data processing system can parse the data packets to identify a request and a trigger keyword corresponding to the request. The data processing system can generate, based on the trigger keyword and the second profile layer pushed to the profile stack data structure, a first action data structure responsive to the request. The data processing system can provide the first action data structure for execution. The data processing system can remove, responsive to detection of a trigger event, the second profile layer from the profile stack data structure.

At least one aspect is directed to a method of processing stacked data structures. The method can include one or more processors receiving data packets comprising an input audio signal detected by a sensor of a local computing device. The method can include the one or more processors establishing a session with a profile stack data structure for use in the session. The profile stack data structure can include a first profile layer having one or more policies. The method can include the one or more processors identifying, based on a lookup in a data repository, an electronic account corresponding to the data packets. The electronic account can include a second profile layer. The method can include the one or more processors adding, to the profile stack data structure established for the session, the second profile layer associated retrieved from the electronic account. The method can include the one or more processors parsing the data packets or the input audio signal to identify a request and a trigger keyword corresponding to the request. The method can include the one or more processors generating, based on the trigger keyword and the second profile layer pushed to the profile stack data structure, a first action data structure responsive to the request. The method can include the one or more processors providing the first action data structure for execution. The method can include the one or more processors removing, responsive to detection of a trigger event, the second profile layer from the profile stack data structure.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
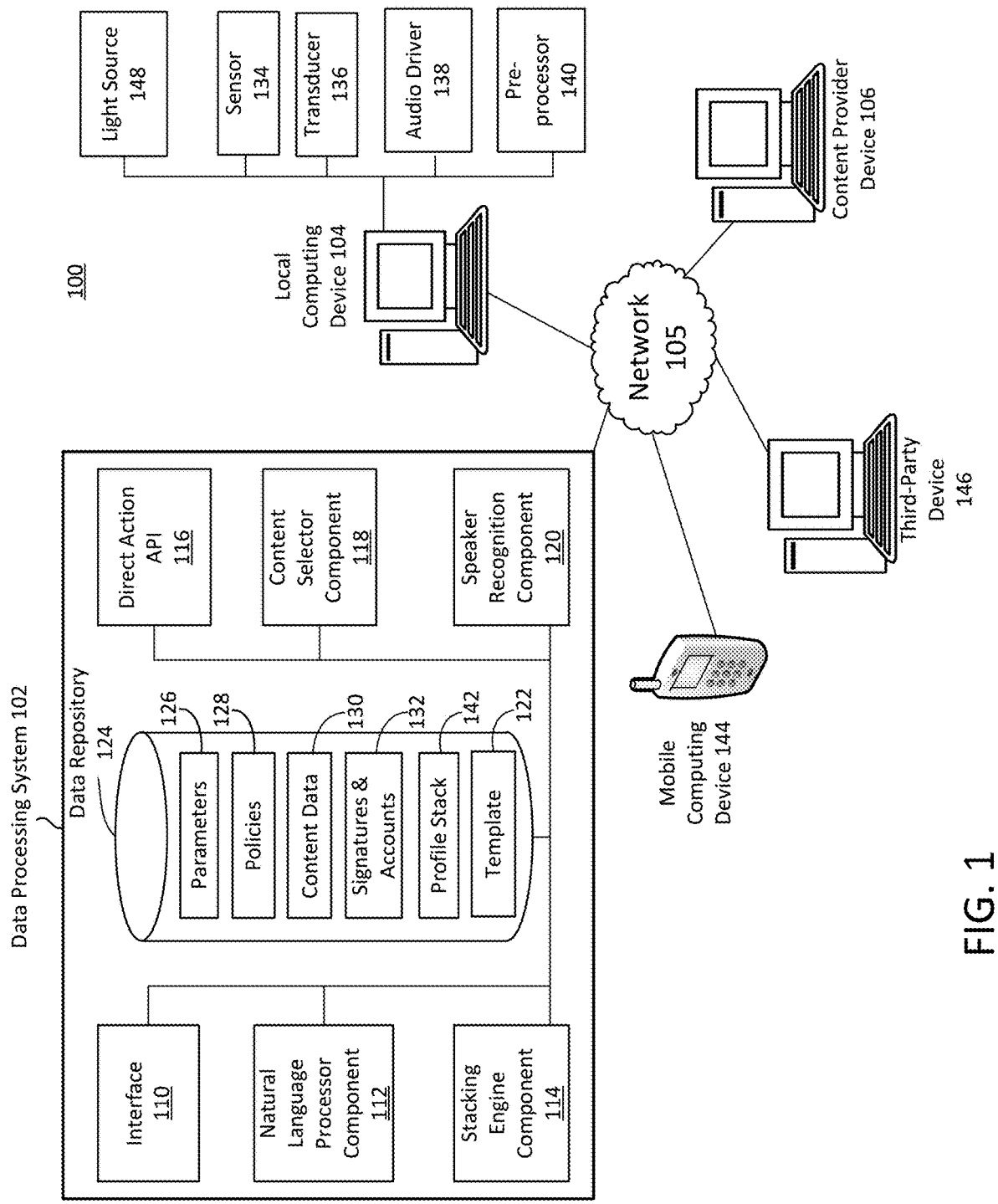
FIG. 1 is an illustration of a system to process stacked data structures via a computer network.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to processing stacked data structures to operate and improve the efficiency of a digital assistant in a public location. A data processing system can perform speaker recognition to identify an electronic account, and then push a profile associated with the speaker to a profile stack data structure that includes a first layer having a baseline profile established by a third-party entity associated with the public location. The data processing system can disassemble the profile stack data structure responsive to a trigger event, thereby maintaining security and reducing erroneous remote procedure calls.

The present solution can reduce resource consumption, processor utilization, battery consumption, bandwidth utilization, size of an audio file, or amount of time consumed by a speaker by parsing voice-based instructions from an end user, identifying an acoustic signature, selecting a corresponding profile, pushing the profile to a profile stack comprising a default profile in a first layer, constructing an action data structure using the selected profile, determining whether the action data structure complies with the default profile, routing the action data structure to a corresponding device, and then disassembling the profile stack responsive to a trigger event.

Systems and methods of the present solution can configure a digital assistant for use in a public setting, such as a hotel room, or to allow guests to sign into a digital assistant for temporary use (e.g., 10 minutes, 30 minutes, 1 hour, 2 hours, 24 hours, 48 hours, 72 hours). The solution can allow the digital assistant to intelligently engage and disengage from an account by reverting back to a previous configuration and erasing or protecting all session information. The digital assistant can intelligently engage by further establishing sessions or links with any third-party devices or interfaces. The digital assistant can provide secure authentication mechanisms to help ensure the correct device is utilized for a service, such as showing a quick response code, optical code, barcode, or other visual or acoustic signal that can provide fingerprinting. The solution can disengage by resetting the digital assistant to factory settings, automatically triggering a disengagement, and providing redundant mechanisms to ensure proper disengagement. The solution can also allow for customization of the digital assistant or digital content provided by the digital assistant. For example, digital components for the hotel providing the digital assistant can be more heavily weighted to provide branding for the hotel. Also, digital components can be provided for the digital assistant if the user doesn't already have a digital assistant.

FIG. 1 illustrates an example system 100 to process a profile stack. The system 100 can include content selection infrastructure. The system 100 can include a data processing system 102. The data processing system 102 can communicate with one or more of a content provider computing device 106, third-party device 146, or local computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one local computing device 104, such as a laptop, desktop, tablet, digital assistant device, smart phone, portable computers, or speaker. For example, via the network 105 a user of the local computing device 104 can access information or data provided by a content provider 106. The computing device 104 may or may not include a display; for example, the computing device may include limited types of user interfaces, such as a microphone and speaker. In some cases, the primary user interface of the computing device 104 may be a microphone and speaker, or voice interface.

The local computing device 104 can refer to a computing device or client device that is located at a public setting, such as a public location 202, or a private setting, such as the private location 402. The term local can refer to the computing device being located where a user can interact with the computing device using voice input or other input. The local computing device can be located remote from a remote server, such as a data processing system 102. Thus, the local computing device 104 can be positioned in a hotel room, mall, cubicle, or other building or abode at which a user can interact with the local computing device 104 using voice input, whereas the data processing system 102 can be located remotely in a data center, for example. The local computing device 104 can be referred to as a digital assistant device.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the local client computing device 104. For example, via the network 105 a user of the local client computing device 104 can access information or data provided by the content provider computing device 106 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider computing device 106 (content provider 106), or the third-party device 146 (or third-party 146). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device 146. The third-party device 146 can include at least one logic device such as a computing device having a processor to communicate via the network 105, for example with the computing device 104, the data processing system 102, or the content provider 106. The third-party device 146 can include at least one computation resource, server, processor or memory. For example, third-party device 146 can include a plurality of computation resources or servers located in at least one data center.

The content provider device 106 can provide audio based digital components for display by the local computing device 104 as an audio output digital component. The digital component can include an offer for a good or service, such as a voice based message that states: "Would you like me to order you a taxi?" For example, the content provider computing device 106 can include memory to store a series of audio digital components that can be provided in response to a voice based query. The content provider computing device 106 can also provide audio based digital components (or other digital components) to the data processing system 102 where they can be stored in the data repository 124. The data processing system 102 can select the audio digital components and provide (or instruct the content provider computing device 104 to provide) the audio digital components to the local client computing device 104. The audio based digital components can be exclusively audio or can be combined with text, image, or video data.

The third-party device 146 can include, interface with, or otherwise communicate with the data processing system 102. The third-party device 146 can include, interface, or otherwise communicate with the local computing device 104. The third-party device 146 can include, interface, or otherwise communicate with the mobile computing device 144. The third-party device 146 can include, interface, or otherwise communicate with the content provider device 106. For example, the third-party device 106 can provide a profile to the data processing system 102 to cause the data processing system 102 to update a stacked profile data structure that is used to generate responses to requests associated with the local computing device 104. The third-party device 106 can provide configuration information or settings for the local computing device 104.

The local computing device 104 can include, interface, or otherwise communicate with at least one sensor 134, transducer 136, audio driver 138, or pre-processor 140. The local computing device 104 can include a light source 148, such as an light indicator, light emitting diode ("LED"), organic light emitting diode ("OLED"), or other visual indicator configured to provide a visual or optic output. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can include a processing unit having hardware configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local client computing device 104 can be associated with an end user that enters voice queries as audio input into the local client computing device 104 (via the sensor 134) and receives audio output in the form of a computer generated voice that can be provided from the data processing system 102 (or the content provider computing device 106 or the service provider computing device 108) to the local client computing device 104, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, signatures and accounts 132, or a profile stack 142, among other data. The parameters 126, policies 128, and signatures 132 or profile stack 142 can include information such as rules about a voice based session between the local client computing device 104 and the data processing system 102 (or the third-party device 146). The content data 130 can include digital components for audio output or associated metadata, as well as input audio messages that can be part of one or more communication sessions with the local client computing device 104.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one stacking engine component 114. The data processing system 102 can include, interface, or otherwise communicate with at least one direct action application programming interface ("API") 116. The data processing system 102 can include, interface, or otherwise communicate with at least one content selector component 118. The data processing system 102 can include, interface, or otherwise communicate with at least one speaker recognition component 120. The data processing system 102 can include, interface, or otherwise communicate with at least one data repository 124. The at least one data repository 124 can include or store, in one or more data structures or databases, parameters 126, policies 128, content data 130, signatures 132, or profile stack 142. Parameters 126 can include, for example, thresholds, distances, time intervals, durations, scores, or weights. Content data 130 can include, for example, content campaign information, content groups, content selection criteria, digital component objects or other information provided by a content provider 106 or obtained or determined by the data processing system to facilitate content selection. The content data 130 can include, for example, historical performance of a content campaign. Policies 128 can include, for example, a policy to allow or block certain types of actions or content delivery at the local computing device 104. Signatures 132 can include acoustic or audio signatures. The signatures 132 can refer to an acoustic fingerprint, which can include a condensed digital summary, a fingerprint, deterministically generated from an audio signal, that can be used to identify an audio sample or quickly locate similar items in an audio database. The signatures 132 can include data to facilitate identifying a profile by the speaker recognition component 120. The profile stack data structure 142 can include one or more profiles that are layered, stacked, or merged and being applied to process input audio signals at the local computing device 104.

The interface 110, natural language processor component 112, stacking engine component 114, direct action API 116, content selector component 118, or speaker recognition component 120 can each include at least one processing unit or other logic device such as programmable logic array engine, or module configured to communicate with the database repository or database 124. The interface 110, natural language processor component 112, stacking engine component 114, direct action API 116, content selector component 118, or speaker recognition component 120 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a local computing device 104 or mobile computing device 144 can affirmatively authorize the data processing system 102 to obtain network activity information corresponding to the local computing device 104 or mobile computing device 144. For example, the data processing system 102 can prompt the user of the computing device 104 for consent to obtain one or more types of network activity information. The identity of the user of the mobile computing device 144 or local computing device 104 can remain anonymous and the computing devices 104 or 144 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, digital component data objects, and content selection criteria. To create a content campaign, content provider 106 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object is at least partially (e.g., 20%, 30%, 30%, 40%, 50%, 60%, 70%, or more) viewable on a display device of the local client computing device 104, or audible via a speaker 136 of the computing device 104. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider 106 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider 106 can provide one or more keywords to be used by the data processing system 102 to select a digital component object provided by the content provider 106. The content provider 106 can identify one or more keywords to bid on, and further provide bid amounts for various keywords. The content provider 106 can provide additional content selection criteria to be used by the data processing system 102 to select digital component objects. Multiple content providers 106 can bid on the same or different keywords, and the data processing system 102 can run a content selection process or ad auction responsive to receiving an indication of a keyword of an electronic message.

The content provider 106 can provide one or more digital component objects for selection by the data processing system 102. The data processing system 102 (e.g., via content selector component 118) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 104 or display device of the computing device 104. Rendering can include displaying the digital component on a display device, or playing the digital component via a speaker of the computing device 104. The data processing system 102 can provide instructions to a computing device 104 to render the digital component object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components. The interface 110 can communicate with one or more of the local computing device 104, content provider device 106, third-party device 146, or mobile computing device 144 via network 105.

The data processing system 102 can interface with an application, script or program installed at the local client computing device 104, such as an app to communicate input audio signals to the interface 110 of the data processing system 102 and to drive components of the local client computing device to render output audio signals. The data processing system 102 can receive data packets or other signal that includes or identifies an audio input signal.

The data processing system 102 can include a speaker recognition component 120 that is designed, constructed and operational to receive an audio input signal detected by the local computing device 104, identify an acoustic signature, and identify an electronic account corresponding to the acoustic signature. The speaker recognition component 120 can receive, via interface 110, data packets that include an input audio signal detected by a sensor 134 or transducer 136 of the local computing device 104. The speaker recognition component 120 can identify an acoustic signature from the input audio signal. The speaker recognition component 120 can identify, based on a lookup in the data repository 124, an electronic account corresponding to the acoustic signature.

The speaker recognition component 120 can receive data packets having a payload carrying the input audio signals. The speaker recognition component 120 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using a digital signal processing technique. The filter can be configured to keep frequencies that correspond to a human voice or human speech, while eliminating frequencies that fall outside the typical frequencies of human speech. For example, a bandpass filter can be configured to remove frequencies bellow a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. In some cases, the pre-processor 140 on the local computing device 104 can apply the bandpass filter prior to transmitting the input audio signal to the data processing system 102, thereby reducing network bandwidth utilization. However, based on the computing resources available to the local computing device 104, it may be more efficient to provide the input audio signal to the data processing system 102 to allow the data processing system 102 to perform the filtering.

The speaker recognition component 120 can apply additional pre-processing or pre-filtering techniques to facilitate identifying the electronic account corresponding to the speaker. For example, the speaker recognition component 120 can apply noise reduction techniques to reduce ambient noise levels that can interfere with speaker recognition. Noise reduction techniques can improve accuracy and speed of speaker recognition, thereby improving the performance of the data processing system 102 in identifying the electronic account.

The speaker recognition component 120 can access signatures 132 stored in the data repository 124. The speaker recognition component 120 can analyze the filtered input audio signal to identify signature, and use the signature to identify an electronic account. Thus, the speaker recognition component 120 can perform speaker recognition or voice recognition to identify an electronic account corresponding to the signature of the input audio signal.

The speaker recognition component 120 can be configured with one or more speaker recognition techniques, such as pattern recognition. The speaker recognition component 120 can be configured with a text-independent speaker recognition process. In a text-independent speaker recognition process, the text used to establish the electronic account can be different from the text used to later recognize the speaker.

For example, the speaker recognition component 120 can identify acoustic features in the input audio signal that differ between input speech sources. The acoustic features can reflect physical or learned patterns that can correspond to a unique input speech source. Acoustic features can include, for example, voice pitch or speaking style. Techniques used to identify, process and store signatures can include frequency estimation (e.g., instantaneous fundamental frequency, or discrete energy separation algorithm), hidden Markov models (e.g., a stochastic model used to model randomly changing systems where the future stated depends on the current state, and in which the system being modeled has unobserved states), Gaussian mixture models (e.g., a parametric probability density function represented as a weighted sum of Gaussian component densities), pattern matching algorithms, neural networks, matrix representation, Vector Quantization (e.g., a quantization technique from signal processing that allows the modeling of probability density functions by the distribution of prototype vectors), or decision trees. Additional techniques can include anti-speaker techniques, such as cohort models, and world models. The speaker recognition component 120 can be configured with a machine learning model to facilitate pattern recognition or adapt to speaker characteristics.

Upon identifying the acoustic signature in the input audio signal, the speaker recognition component 120 can perform a lookup in the data repository 124 or signature data structure 132. The signatures stored in the signature data structure 132 can map to an identifier of an electronic account. The speaker recognition component 120 can perform the lookup in the signature data structure 132 using the signature identified in the input audio signal to retrieve the electronic account corresponding to the signature of the input audio.

In some cases, the speaker recognition component 120 can determine, based on the lookup, an absence of the electronic account corresponding to the acoustic signature. For example, the signature may not be stored in the signature data structure 132 or an electronic account for the signature may not yet have been established. The lookup may return a null value or empty set. Responsive to determining the absence of the signature or an electronic account, the speaker recognition component 120 can create the electronic account in the data repository. The speaker recognition component 120 can update the signature data structure 132 to include a new signature constructed from the input audio signal and a corresponding electronic account. The speaker recognition component 120 can map the electronic account to the new acoustic signature.

The data processing system 102 can include, interface with or otherwise access a stacking engine component 114 designed, constructed and operation to establish a session and combine one or more profiles for use during the session. The stacking engine component 114 can receive the indication of the electronic account from the speaker recognition component 120. The stacking engine component 114 can retrieve information associated with the electronic account from the signatures and accounts data structure 132. The electronic account can store information that facilitates processing input audio queries and generating responses. The electronic account can include a profile that corresponds to the speaker that provided the input audio signal. The profile can include labels, rules, preferences, identifiers, subscriptions, account settings, or device configuration settings. The profile can include configurations information to interact with other remote devices, such as a mobile computing device 144 associated with the electronic account, or other networked devices associated with the electronic account.

For example, the electronic account can include a label for a networked device, such as a thermostat configured to interface with network 105. The thermostat can be located at a first location (e.g., residence) associated with the speaker corresponding to the electronic account. In the profile, the thermostat can have the label "living room" thermostat. When the data processing system 102 receives an input query "what is the temperature in the living room" or "set the temperature in the living room to 70 degrees", the data processing system 102 can determine, via the profile, that the electronic account is linked to a thermostat that has a label "living room", and then provide the label to the direct action API 116 to generate an action data structure corresponding to the thermostat labeled "living room".

However, the local computing device 104 that detects the input audio signal may not be located at the first location. Rather, the local computing device 104 can be located at a second location physically and geographically separate from the first location. The second location can be a location managed, administered, under the control of, or otherwise maintained by a third-party entity associated with the third party-device. The second location can be an unsecured location, a public location, or a temporary location, such as a hotel room, meeting room, conference room, retail store, rental vehicle, guest room, hostile, or dormitory.

The third-party device 146 that maintains the public location or unsecured location can establish and maintain the local computing device 104. The third-party device 146 can establish a baseline or default profile for the local computing device 104. The third-party device 146 can provide a first profile. The first profile can be a baseline profile, default profile, or third-party profile. The third-party device 146 can establish the first profile. The first profile can include one or more policies or rules established by the third-party device 146. For example, the third-party device 146 can provide policies, rules or configuration settings that block or prevent certain types of activities or actions, while more heavily weighting other types of activities or actions. The policy can be stored in the first profile.

The first profile can include labels for internet connected devices. The labels in the first profile can be established or provided by the third-party device 146. For example, the labels can correspond to internet connected devices (e.g., internet connected thermostat, internet connected light source, internet connected smoke alarm, internet connected appliance, internet connected display, internet connected television, or internet connected speaker). The labels for these internet connected devices can be provided by the third-party entity. For example, the label can be "hotel thermostat" or "Brand A Hotel thermostat".

The third-party device 146 can provide the first profile to the data processing system 102 to cause the data processing system 102 to push the first profile to a profile stack initiated for a session associated with the local computing device 104. The stacking engine component 114 can store, place, or stack the first profile in a first profile layer in the profile stack that is established for the session. The profile stack data structure can include the first profile layer having one or more policies configured by a device of a third-party entity (e.g., third-party device 146).

The stacking engine component 114 can establish, responsive to identification of the electronic account, a session. The session can refer to communication session, digital assistant session, direct action session, content selection session, digital component selection session, or profile session. A session can have a duration. The session can continue until a termination event or condition occurs. The termination event can cause the session to end. The state of the session can be stored upon termination. A profile in the profile stack can be updated upon termination of the session.

The stacking engine component 114 can establish a profile stack data structure for use in the session. The stacking engine component 114 can initialize the profile stack data structure to include the first profile provided by the third-party device 146.

The stacking engine component 114 can push the first profile (e.g., a default profile for the local computing device 104) to a first layer in the profile stack. For example, the stacking engine component 114 can determine that the default profile is provided by the third-party device 146 that is associated with the same third-party that maintains, owns, manage, or administers the local computing device 104.

The stacking engine component 114 can then retrieve a second profile corresponding to the electronic account and signature. The stacking engine component 114 can push the second profile to the profile data structure. For example, the first profile layer can include the first profile, and the second profile layer can include the second profile.

The stacking engine component 114 can provide the profile stack comprising the first profile layer and the second profile layer to one or more components of the data processing system 102 for further processing. In some cases, the stacking engine component 114 can meld, merge or otherwise combine the first profile layer and the second profile layer to create a single profile layer. In some cases, the stacking engine component 114 can provide the profile stack with the two profile layers to the direction action API 116 or content selector component 118 for further processing.

Establishing the profile stack data structure with the second profile layer and the first profile layer can include engaging with one or more internet connected devices, sessions, interfaces, or third-party devices associated or indicated in the first profile layer and the second profile layer. For example, the first profile layer can include internet connected devices 204, 206, 208, 210, and 212 depicted in the secured public setting 202 of FIG. 2, and the second profile layer can include internet connected devices 204, 206, 208, 210, and 212 depicted in the private setting 402 in FIG. 4. The internet connected devices in the public setting 202 can have different identifiers as compared to the internet connect devices in the private setting 402. The data processing system 102, upon establishing the profile stack data structure, can ping, poll, or otherwise query each of the internet connected devices to perform a status check or enter a readiness state.

The data processing system 102 can use the profile stack to process queries or actions received via input audio signals from the local computing device 104. The data processing system 102 can use the NLP component 112 to identify the query in the input audio signal, and then the direct action API 116 can use the profile stack to process the input query to generate an action data structure that is in accordance with, and compliant with, the profile stack.

For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the local client computing device 104. Via the transducer 136, the audio driver 138, or other components the local client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests: a first request for a service provider that performs laundry services, and a second request for a service provider that provides dry cleaning services. In some cases, the NLP component 112 can combine the multiple determined requests into a single request, and transmit the single request to a third-party device 146. In some cases, the NLP component 112 can transmit the individual requests to another service provider device, or separately transmit both requests to the same third-party device 146.

The data processing system 102 can include a direct action API 116 designed and constructed to generate, based on the trigger keyword, an action data structure responsive to the request. Processors of the data processing system 102 can invoke the direct action API 116 to execute scripts that generate a data structure to provide to a third-party device 146 or other service provider to order a service or product, such as a car from a car share service. The direct action API 116 can obtain data from the data repository 124, as well as data received with end user consent from the local client computing device 104 to determine location, time, user accounts, logistical or other information to allow the third-party device 146 to perform an operation, such as reserve a car from the car share service. Using the direct action API 116, the data processing system 102 can also communicate with the third-party device 146 to complete the conversion by in this example making the car share pick up reservation.

The direct action API 116 can receive the profile stack constructed by the stacking engine component 114 for the session. The direct action API 116 can apply one or more policies from the profile stack when executing a specified action to satisfy the end user's intention, as determined by the data processing system 102. Depending on the action specified in its inputs and the layered profiles and policies in the profile stack constructed by the stacking engine component 114 for the session, the direct action API 116 can execute code or a dialog script that identifies the parameters required to fulfill a user request. Such code can look-up additional information, e.g., in the data repository 124, such as the name of a home automation service, or third-party service, or it can provide audio output for rendering at the local client computing device 104 to ask the end user questions such as the intended destination of a requested taxi. The direct action API 116 can determine parameters and can package the information into an action data structure, which can then be sent to another component such as the content selector component 118 or to the service provider computing device 108 to be fulfilled.

The direct action API 116 can receive an instruction or command from the NLP component 112, or other component of the data processing system 102, to generate or construct the action data structure. The direct action API 116 can determine a type of action in order to select a template from the template repository 122 stored in the data repository 124. Types of actions can include, for example, services, products, reservations, or tickets. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 112 can parse the input audio signal to identify a request and a trigger keyword corresponding to the request, and provide the request and trigger keyword to the direction action API 116 to cause the direct action API to generate, based on the trigger keyword and the second profile layer pushed to the profile stack data structure, a first action data structure responsive to the request that is compatible with the first profile layer of the profile stack data structure.

The direct action API 116, upon identifying the type of request, can access the corresponding template from the template repository 122. Templates can include fields in a structured data set that can be populated by the direct action API 116 to further the operation that is requested via input audio detected by the local computing device 104 of the third-party device 146 (such as the operation of sending a taxi to pick up an end user at a pickup location and transport the end user to a destination location). The direct action API 116 can perform a lookup in the template repository 122 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 104 or a user interface of the device 104. For example, the direct action API 116 can detect the source location using a location sensor, such as a GPS sensor. The direct action API 116 can obtain further information by submitting a survey, prompt, or query to the end of user of the computing device 104. The direct action API can submit the survey, prompt, or query via interface 110 of the data processing system 102 and a user interface of the computing device 104 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the third-party device 146.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 112 (e.g., the location of the local client computing device 104 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the local client computing device 104, prompting the end user of the local client computing device 104 for the information, or accessing an online web-based resource using an HTTP protocol. For example, the data processing system 102 can determine that it does not have the current location of the local client computing device 104, which may be a needed field of the template. The data processing system 102 can query the local client computing device 104 for the location information. The data processing system 102 can request the local client computing device 104 to provide the location information using one or more location sensors 134, such as a Global Positioning System sensor, WIFI triangulation, cell tower triangulation, Bluetooth beacons, IP address, or other location sensing technique.

In some cases, the data processing system 102 can generate the action data structure using the second profile. The data processing system 102 can then determine whether the action data structure generated using the second profile is compliant with the first profile. For example, the first profile can include a policy to block a type of action data structure, such as purchasing a product from an electronic online retailer via the local computing device 104. The input audio detected by the local computing device 104 may have included a request to purchase a product from the electronic online retailer. The data processing system 102 may have used the second profile to identify account information associated with the electronic online retailer, and then generated an action data structure to purchase the product. The action data structure can include the account identifier corresponding to the electronic account associated with the acoustic signature identified by the speaker recognition component 120.

Upon generate the action data structure, the direct action API 116 may attempt to transmit the action data structure to the electronic online retailer. However, the stacking engine component 114 can intercept the action data structure. The stacking engine component 114 can analyze the action data structure to determine whether it complies with the one or more policies in the first profile layer in the profile stack established for the session. If the stacking engine component 114 determines that the action data structure to purchase the product from the electronic retailer is compliant, then the stacking engine component 114 can release the action data structure. If, however, the stacking engine component determines that the action data structure is contrary to, or not compliant with, the first profile layer, then the stacking engine component 114 can block the action data structure.

In some cases, the direct action API 116 can retrieve the profile stack and identify the first profile layer and the second profile layer, where the second profile layer corresponds to a subsequently pushed second profile. The direct action API 116 can generate the action data structure using the last pushed profile, such as the second profile. The direct action API 116 can then compare the action data structure generated using the second profile with one or more policies contained in the first profile. Based on the comparison using the policies, the direct action API 116 can determine whether to approve the action data structure or to block the action data structure.

For example, the data processing system 102 can generate a first action data structure based on the trigger keyword and the second profile layer pushed to the profile stack. The data processing system 102 can generate the first action data structure responsive to the request in the input audio signal. The data processing system 102 can compare the first action data structure with the one or more policies of the first profile layer, where the first profile layer corresponds to a default profile layer or baseline profile layer. The data processing system 102 can determine, based on a comparison of the first action data structure with the one or more policies of the first profile layer, that the first action data structure is compatible with the first profile layer. Responsive to the first action data structure determined to be compatible with the first profile layer, the data processing system 102 can provide the first action data structure for execution.

The policies in the first profile layer can include a policy to block a type of action data structure. Types of action data structure that can be blocked can include, for example, an action data structure to purchase a product or service from a competitor entity of the third-party, unsecure action, or network bandwidth intensive actions (e.g., stream 4K resolution multimedia content, download large data files, such as over 50 megabytes, 100 megabytes, or more). The data processing system can compare a type of the first action with the type of action data structure indicated by the one or more policies of the first profile layer to determine whether the first action data structure is compatible with the first profile layer. If the first action data structure is allowed by the policy (e.g., not blocked by the policy), then the data processing system 102 can approve the first action data structure.

In some cases, the data processing system 102 can receive the trigger keyword identified by the natural language processor and the profile stack data structure. The data processing system 102 can select, based on the trigger keyword and the profile stack data structure, a digital component that is compatible with both the first profile layer and the second profile layer. The digital component can refer to a supplemental digital component. For example, the data processing system 102 can include, execute, or otherwise communicate with a content selector component 118 to receive the trigger keyword identified by the natural language processor and select, based on the trigger keyword, a digital component via a real-time content selection process. The content selection process can refer to, or include, selecting sponsored digital component objects provided by third party content providers 106. The real-time content selection process can include a service in which digital components provided by multiple content providers are parsed, processed, weighted, or matched in order to select one or more digital components to provide to the computing device 104. The content selector component 118 can perform the content selection process in real-time. Performing the content selection process in real-time can refer to performing the content selection process responsive to the request for content received via the local client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the local client computing device 104, or within a time interval after the communication session is terminated.

For example, the data processing system 102 can include a content selector component 118 designed, constructed, configured or operational to select digital component objects. To select digital components for display in a voice-based environment, the data processing system 102 (e.g., via NLP component 112) can parse the input audio signal to identify keywords (e.g., a trigger keyword), and use the keywords to select a matching digital component based on a broad match, exact match, or phrase match. For example, the content selector component 118 can analyze, parse, or otherwise process subject matter of candidate digital components to determine whether the subject matter of the candidate digital components correspond to the subject matter of the keywords or phrases of the input audio signal detected by the microphone of the local client computing device 104. The content selector component 118 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 118 may process the metadata to determine whether the subject matter of the candidate digital component corresponds to the input audio signal.

The content selector component 118 can further utilize information provided in the profile stack to perform content selection. The content selector component 118 can utilize the second profile layer, which can correspond to the electronic account associated with the speaker that provided the input audio signal detected by the local computing device 104. The content selector 118 can also use information associated with the first profile layer, which can correspond to the default profile layer that was provided by the third-party device 146. The content campaign provided by the content provider 106 can include content selection criteria that the data processing system 102 can match to criteria indicated in the second profile layer or the first profile layer.

The profile layer can alter weights or scores used by the content selector component 118 to select a digital component. For example, the first profile layer established by the third-party device can increase the weight or score for digital components for or describing products or services provided by the third-party entity, while lowering the weight or score for products or services provided by a competitor of the third-party entity. Because the local computing device 104 can be located in a setting controlled by the third-party entity, the third-party entity can establish content selection rules, policies, or weighting in the first profile layer that are to be utilized by the content selector component 118 during content selection.

By using the second profile layer to select digital components, the content selector component 118 can reduce excessive transmissions of digital components by more precisely selecting a digital component based on the second profile layer and not just the first profile layer. Selecting digital components using the profile stack constructed from multiple profiles, as opposed to just selecting digital components using the first layer (or default layer) or just the second layer (the profile associated with the electronic account) can result in an erroneous or irrelevant digital component selection. The first profile layer can provide information associated with the third-party entity or the public or unsecure location at which the local computing device 104 is located that may facilitate content selection, or block an erroneous content selection. For example, the input audio signal can include a request for dry cleaning service. The content selector component 118 may receive the request and attempt to identify a supplemental digital component provided by a content provider device 106. To identify a supplemental content provider, the content selector component 118 can execute a real-time content selection process using one or more characteristics associated with the request. The content selector component 118 can further input information obtained from the second profile layer. Using the information from the second profile layer, the content selector component 118 may select a digital component corresponding to a dry cleaning service provider. However, the first profile layer can include a policy that blocks provision of supplemental digital components related to dry cleaning service providers because the third-party entity that established the first profile layer may provide dry cleaning services that are preferred. The content selector component 118 may not have selected a digital component for the dry cleaning services provided by the third-party entity because the third-party entity may not have established a content campaign for their own dry cleaning services. Thus, without utilizing the profile stack comprising both the first profile layer and the second profile layer, the data processing system 102 may have erroneously provided a supplemental digital component corresponding to a dry cleaning service provider when the preferring digital component corresponds to a dry cleaning service provided by the third-party entity, which is identified in the first profile layer. Thus, the data processing system 102 can overwrite or replace the selected digital component with the preferred digital component indicated via the first profile layer (or default profile layer).

In some cases, the content selector component 118 can parse the first profile layer to determine whether the first profile layer includes a policy or information that blocks selection of a type of digital component, and prevent executing the real-time content selection process, thereby reducing the utilization of computing resources as well as potentially reducing delay or latency in providing a digital component responsive to the request contained in the input audio signal.

Content providers 106 may provide additional indicators when setting up a content campaign that includes digital components. The content provider 106 may provide information at the content campaign or content group level that the content selector component 118 may identify by performing a lookup using information about the candidate digital component. For example, the candidate digital component may include a unique identifier, which may map to a content group, content campaign, or content provider. The content selector component 118 may determine, based on information stored in content campaign data structure in data repository 124, information about the content provider 106.

The data processing system 102 can receive, via a computer network, a request for content for presentation on a computing device 104. The data processing system 102 can identify the request by processing an input audio signal detected by a microphone of the local client computing device 104. The request can include selection criteria of the request, such as the device type, location, and a keyword associated with the request. The request can include the action data structure or action data structure.

Responsive to the request, the data processing system 102 can select a digital component object from data repository 124 or a database associated with the content provider 106, and provide the digital component for presentation via the computing device 104 via network 105. The digital component object can be provided by a content provider device 108 different from the third-party device 146. The digital component can correspond to a type of service different from a type of service of the action data structure (e.g., taxi service versus food delivery service). The computing device 104 can interact with the digital component object. The computing device 104 can receive an audio response to the digital component. The computing device 104 can receive an indication to select a hyperlink or other button associated with the digital component object that causes or allows the computing device 104 to identify service provider 108, request a service from the service provider 108, instruct the service provider 108 to perform a service, transmit information to the service provider 108, or otherwise query the third-party device 146.

The data processing system 102 (e.g., via interface 110 and network 105) can transmit data packets comprising the output signal that is responsive to the input audio signal, or request or query thereof. The output signal can cause the audio driver component 138 of or executed by the client device 104 to drive a speaker (e.g., transducer 136) of the local computing device 104 to generate an acoustic wave corresponding to the output signal.

The data processing system 102 (e.g., via stacking engine component 114) can disassemble the profile stack data structure to remove one of the first profile layer or the second profile layer from the profile stack data structure. The data processing system can disengage from the electronic account by reverting back to a previous configuration or default configuration, and erasing or protecting all information associated with the session and the electronic account. For example, the data processing system can remove or delete the second profile layer from the profile stack data structure configured for the local computing device 104. The data processing system 102 can revert or reset the local computing device 104 to a factory setting or default configuration. The data processing system 102 can upload any session related information to the second profile stored in the data processing system 102, and remove or purge any local copy of the information associated with the second profile.

The data processing system 102 can remove one of the first or second profile layers from the profile stack responsive to detection of a trigger event. The trigger event can be based on a time interval, instruction, event, location, geofence, unauthorized use, fraud detection, or new speaker recognition. The data processing system 102 can determine to remove one of the first profile or the second profile based on the type of trigger event.

The data processing system 102 (e.g., via speaker recognition component 120) can determine that a different user is providing input audio signals to the local computing device 104. The different user can be a second user that that is not the same as the first user. The second user can have a different acoustic signature. The speaker recognition component 120 can detect the second acoustic signature, determine that there is a different user, and then terminate the session with the first user. The speaker recognition component 120 can provide an indication of the second, different user to the stacking engine component 114, which can remove the second profile layer from the profile stack. The stacking engine component 114, responsive to receiving the indication of the second user different from the first user, can clear the profile stack data structure or just remove the second profile layer corresponding to the first user.

The data processing system 102 receive, via the interface 110, second data packets comprising a second input audio signal detected by the sensor 134 of the client device (e.g., local computing device 104). The second input audio signal can be detected subsequent to the audio signal. The data processing system 102 (e.g., speaker recognition component 120) can identify a second acoustic signature from the second input audio signal. The second acoustic signature can be different from the first acoustic signature. The data processing system 102 can determine the trigger event based on identification of the second acoustic signature different from the first acoustic signature The stacking engine component 114 can clear the profile stack or remove the second profile layer responsive to inactivity for time interval. The stacking engine component 114 can clear the profile stack or the second profile layer responsive to the user corresponding to the second profile layer not providing any voice input for a time interval, such as 5 minutes, 10 minutes, 15 minutes, 20 minutes, 25 minutes, 30 minutes, 1 hour, or more. Clearing the profile stack or removing the second profile layer can provide increased security as well as well as maintain a minimal profile stack in memory.

The stacking engine component 114 can clear the profile stack responsive to determining that the user corresponding to the second profile layer has left the public location or unsecure location corresponding to the local computing device 104 or the third-party entity. The stacking engine component 114 can receive an indication from the mobile computing device 144, which can be carried by the user, that the mobile computing device 144 is greater than a threshold distance away from the local computing device 104. The threshold distance can be 20 meters, 25 meters, 50 meters, 100 meters, 200 meters, 500 meters, 750 meters, 1000 meters, or more. For example, the stacking engine component 114 can establish a geographic fence around the local computing device 104. The geographic fence can refer to a virtual geographic boundary, defined by Global Positioning System ("GPS") or radio frequency identification ("RFID") or near field communication beacons, that allows software to trigger a response when a mobile device enters or leaves a particular area around the local computing device 104. Thus, when a user leaves the hotel room with their mobile computing device 144, the data processing system 102 can automatically remove the second profile layer from the profile stack used to process voice input detected by the local computing device 104.

The stacking engine component 114 can interface with the third-party device 146 and receive an indication from the third-party device 146 to clear the profile stack or remove the second profile layer. For example, the third-party device 146 can include an electronic hotel guest management system that receive an indication that the user associated with the second profile layer has checked out of the hotel room. Responsive to receiving the indication that the guest has checked out, the third-party device 146 can forward the indication to the data processing system 102. The data processing system 102 (e.g., stacking engine component 114) can receive the indication that the guest has checked out and, responsive to the indication, remove the second profile layer from the profile stack used to process voice input associated with the local computing device 104, thereby disassembling the profile stack.

Disassembling the profile stack data structure can include removing or clearing one or more profiles from the profile stack. Disassembling the profile stack can include removing only the first profile layer, removing only the second profile layer, or removing both the first profile layer and the second profile layer. For example, the data processing system can remove the second profile layer that corresponds to the electronic account corresponding to the acoustic signature, while keeping the first profile layer corresponding to a default profile layer.

Figure 2:
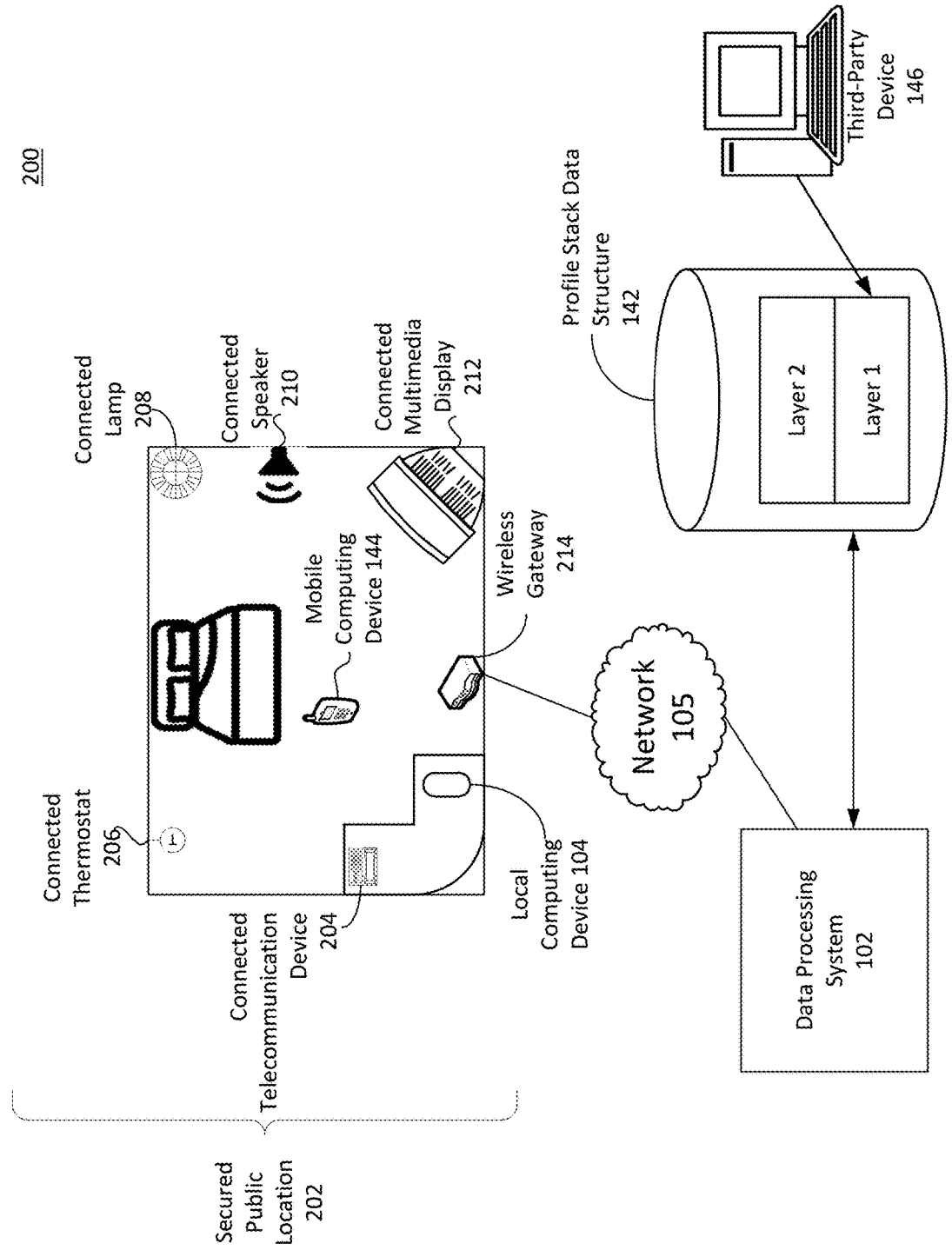
FIG. 2 is an illustration of an operation of a system to process stacked data structures via a computer network.

FIG. 2 is an illustration of the operation of system 100 to process a profile stack. The system 100 can operate in an environment 200. The environment 200 can include one or more component of system 100 depicted in FIG. 1 or system 700 depicted in FIG. 7. The environment 200 can include a secured public location 202. The secured public location 202 can refer to a public location. A public location can refer to a location, place, building, house, room, or other structure or place that can be occupied by multiple users at the same time or at different times, or accessed by multiple users. For example, a public place or public location can include a hotel room, motel room, guest room, rental car, physical retail store, mall, park, office, or cubicle. In this example, the secured public location 202 can be a hotel room. The public location 202 can be secured because the mobile computing device 144 may be located within the location 202, thereby indicating that the user may be present. However, the system may deem the location 202 to be unsecure based on a trigger event or time interval without activity, regardless of whether the mobile computing device 144 is located within the location 202.

The hotel room (or secured public location 202) can include several internet connected devices, such as a connected telecommunication device 204 (e.g., connected telephone), a connected thermostat 206, connected lamp 208, connected speaker 210 (or sound system), or connected multimedia display 212 (or smart television). The internet connected devices 204, 206, 208, 210 or 212 can connect to network 105 via a wireless gateway 214 (e.g., network router, wireless router, or modem), which can provide access to network 105. The internet connected devices 204, 206, 208, 210 or 212 can be monitored, managed, or controlled via data processing system 102. In some cases, the internet connected devices 204, 206, 208, 210 or 212 can be monitored, managed, or controlled by the third-party device 146 via the data processing system 102.

In the illustrative environment 200 depicted in FIG. 2, the mobile computing device 144 is located in the hotel room or secured public location 202. The local computing device 104 is also located in the secured public location 202. The local computing device 104 can receive voice input from a user located in the hotel room. The local computing device 104 can generate data packets comprising the input audio, and transmit the data packets to the data processing system 102 via wireless gateway 214 and network 105. The data processing system 102 can receive the data packets and perform speaker recognition to identify an acoustic signature from the input audio signal. The data processing system 102 can then identify an electronic account corresponding to the acoustic signature. The data processing system 102 can select a profile corresponding to the electronic account, and then push the profile to the profile stack data structure 142 for the local computing device 104. The profile stack data structure 142 can be specific to the local computing device 104. For example, each local computing device 104 can have a respective profile stack data structure 142. The profile stack data structure 142 for the local computing device 104 can be stored or maintained on the data processing system 102 (e.g., in a data repository or memory of the data processing system 102) to facilitate processing using the profile stack data structure 142. In some cases, the profile stack data structure 142 can be stored locally in memory on the local computing device 104.

The profile stack data structure 142 can include a first profile layer "Layer 1" that corresponds to the default profile or baseline profile established by the third-party device 146. The third-party device 146 can provide the layer 1 profile to the data processing system 102 for placement in the profile stack data structure 142. The data processing system 102, responsive to detecting the acoustic signature, can push a second profile corresponding to the electronic account to the profile stack data structure 142 for placement in a second profile layer "Layer 2".

The Layer 1 profile can include predetermined labels for the internet connected devices 204, 206, 208, 210 or 212. The labels can be established via the third-party device 146. The third-party device 146 can be associated with a third-party entity that manages, owns, or administrates the secured public location 202 (e.g., hotel).

The second profile layer in Layer 2 can include profile information associated with the electronic account of the user corresponding to the acoustic signature. The second profile may or may not include labels for internet connected devices 204, 206, 208, 210 or 212. In the event the second profile includes a label for an internet connected device that is similar to a label provided in the Layer 1, the data processing system 102 can determine to use the Layer 1 label because the labels in Layer 1 may be ranked higher or prioritized higher than the labels in Layer 2. In some cases, the data processing system 102 can provide a prompt to the user to clarify which internet connected device is being referred to facilitate disambiguation and reduce the number of action data structures that are transmitted to internet connected devices, thereby reducing network bandwidth utilization as well as computing resource utilization by the unintended internet connected devices.

For example, the input audio can include a request to "turn on my living room lamp". If the profile stack data structure only included the Layer 1 profile, then the data processing system 102 may determine that the lamp corresponds to the connected lamp 208 because there is only one connected lamp in the hotel room 202. The data processing system 102 may then turn on the connected lamp 208 by sending an action data structure including an instruction to the connected lamp 208 via the network 105. If, however, there is a Layer 2 profile loaded in the profile stack data structure 142, the data processing system 102 can parse the second profile to determine whether it contains a label "living room lamp". The label "living room lamp" may correspond to a lamp at a private residence associated with the electronic account. If the data processing system 102 detects the label "living room lamp", then the data processing system 102 may transmit an action data structure including an instruction to the connected living room lamp located at the private residence.

The local computing device 104 can include an audio driver 138, a transducer 136, a sensor 134 and a pre-processor component 140. The sensor 134 can receive or detect an input audio signal (e.g., voice input). The pre-processor component 140 can be coupled to the audio driver, the transducer, and the sensor. The pre-processor component 140 can filter the input audio signal to create a filtered input audio signal (e.g., by removing certain frequencies or suppressing noise). The pre-processor component 140 can convert the filtered input audio signal to data packets (e.g., using a software or hardware digital-to-analog converter). In some cases, the pre-processor component 140 can convert the unfiltered input audio signal to data packets and transmit the data packets to the data processing system 102. The pre-processor component 140 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and a profile stack data structure for use in the session. The profile stack data structure comprising a first profile layer having one or more policies configured by a device of a third-party entity. The data processing system 102 can push, to the profile stack data structure established for the session, a second profile layer retrieved from the electronic account.

The data processing system 102 can parse the input audio signal to identify a request and a trigger keyword corresponding to the request. The data processing system 102 can generate, based on the trigger keyword and the second profile layer pushed to the profile stack data structure, a first action data structure responsive to the request that is compatible with the first profile layer of the profile stack data structure. The data processing system 102 can provide the first action data structure for execution. The data processing system 102 can disassemble, responsive to detection of a trigger event, the profile stack data structure to remove one of the first profile layer or the second profile layer from the profile stack data structure.

The data processing system 102 can provide, to the pre-processor component of the local computing device 104, a status of the profile stack data structure. The status can indicate that the second profile layer has been pushed to the profile stack. The status can indicate that both the first profile layer and second profile layer are in the profile stack. The status can indicate that the second profile layer has been removed from the profile stack. The status can indicate that the profile stack has been cleared or returned to a default state (e.g., with only the first profile layer in the profile stack). Various terms can be used to indicate the status, including, for example, "secured setting"; "public setting"; "<identifier of electronic account>"; or "ready".

The local computing device 104 can receive the indication of the status. The audio driver can receive the indication of the status of the profile stack data structure, and generate an output signal based on the indication. The audio driver can convert the indication to an output signal, such as sound signal, or acoustic output signal. The audio driver can drive the transducer 136 (e.g., speaker) to generate sound based on the output signal generated by the audio drive.

In some cases, the local computing device 104 can include a light source. The light source can include one or more LEDs, lights, display, or other component or device configured to provide an optical or visual output. The pre-processor component can cause the light source to provide a visual indication corresponding to the status of the profile stack data structure. For example, the visual indication can be a status indicator light that turns on, a change in color of the light, a light pattern with one or more colors, or a visual display of text or images.

Figure 3:
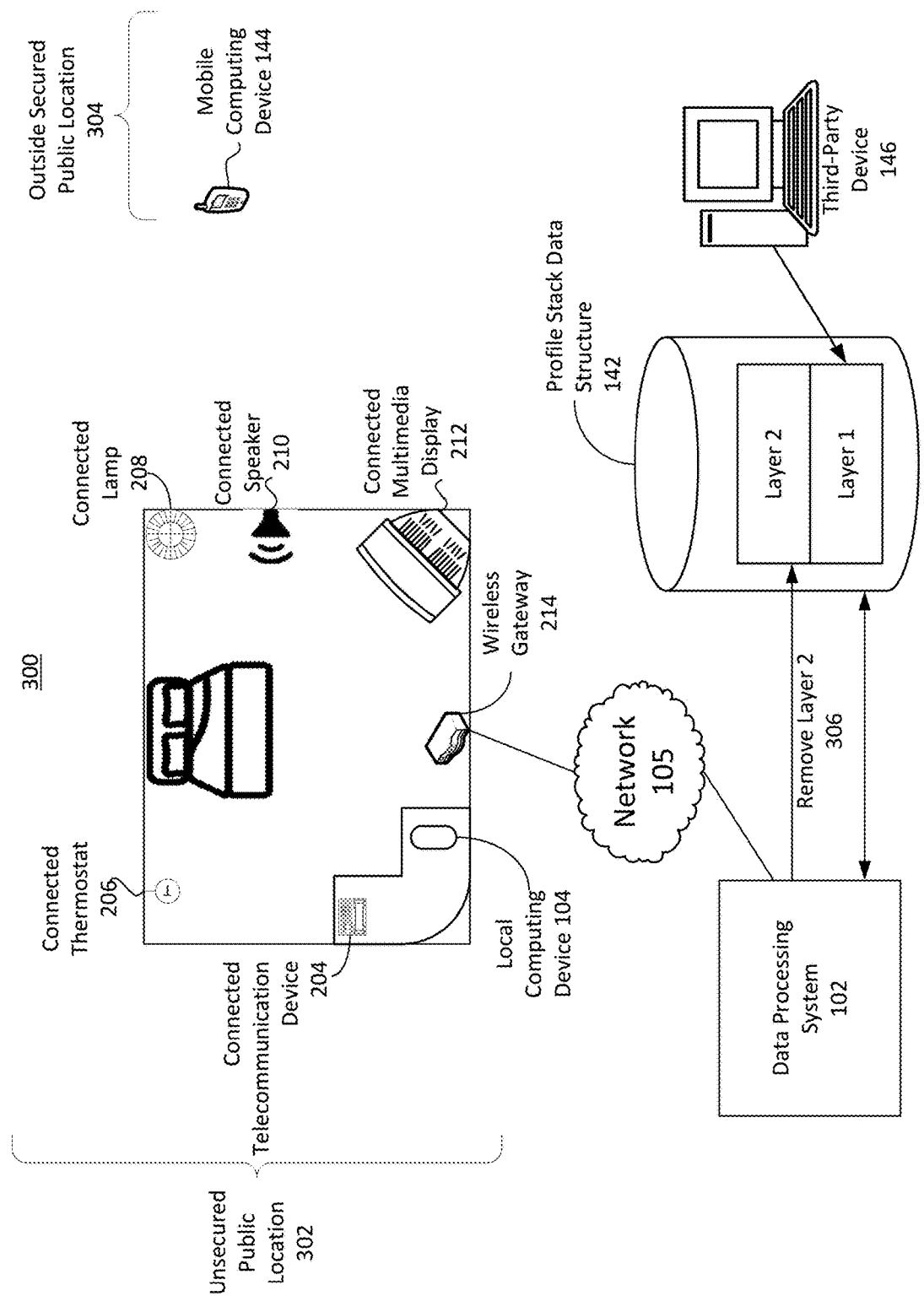
FIG. 3 is an illustration of an operation of a system to process stacked data structures via a computer network.

FIG. 3 is an illustration of the operation of system 100 to process a profile stack. The system 100 can operate in an environment 300 can include one or more component of system 100 depicted in FIG. 1, environment 200 depicted in FIG. 2, or system 700 depicted in FIG. 7. The environment 300 can include the same location 202 depicted in FIG. 2, but the location may not be an unsecured public location 302, as opposed to a secured public location 202. The public location may be an unsecured public location 302 because the mobile computing device 144 is located outside the secured public location 304. Outside the secured location 304 can refer to being outside a geographic fence or further than a distance threshold from the local computing device 104. The internet connected devices 204, 206, 208, 210, and 212 inside the unsecured public location 302 can be the same internet connected devices inside the secured public location 202. However, the mobile computing device 144 leaving the location 302 can trigger a termination event that causes the data processing system 102 to disassemble the profile stack data structure 142. Disassembling the profile stack data structure 142 can include removing the second profile in the Layer 2, while leaving the first profile in Layer 1. The data processing system 102 can return the profile stack data structure 142 to a default state configured for the local computing device 104 established by the third-party. For example, the data processing system 102 can transmit an instruction 306 to remove Layer 2 from the profile stack data structure 142.

Figure 4:
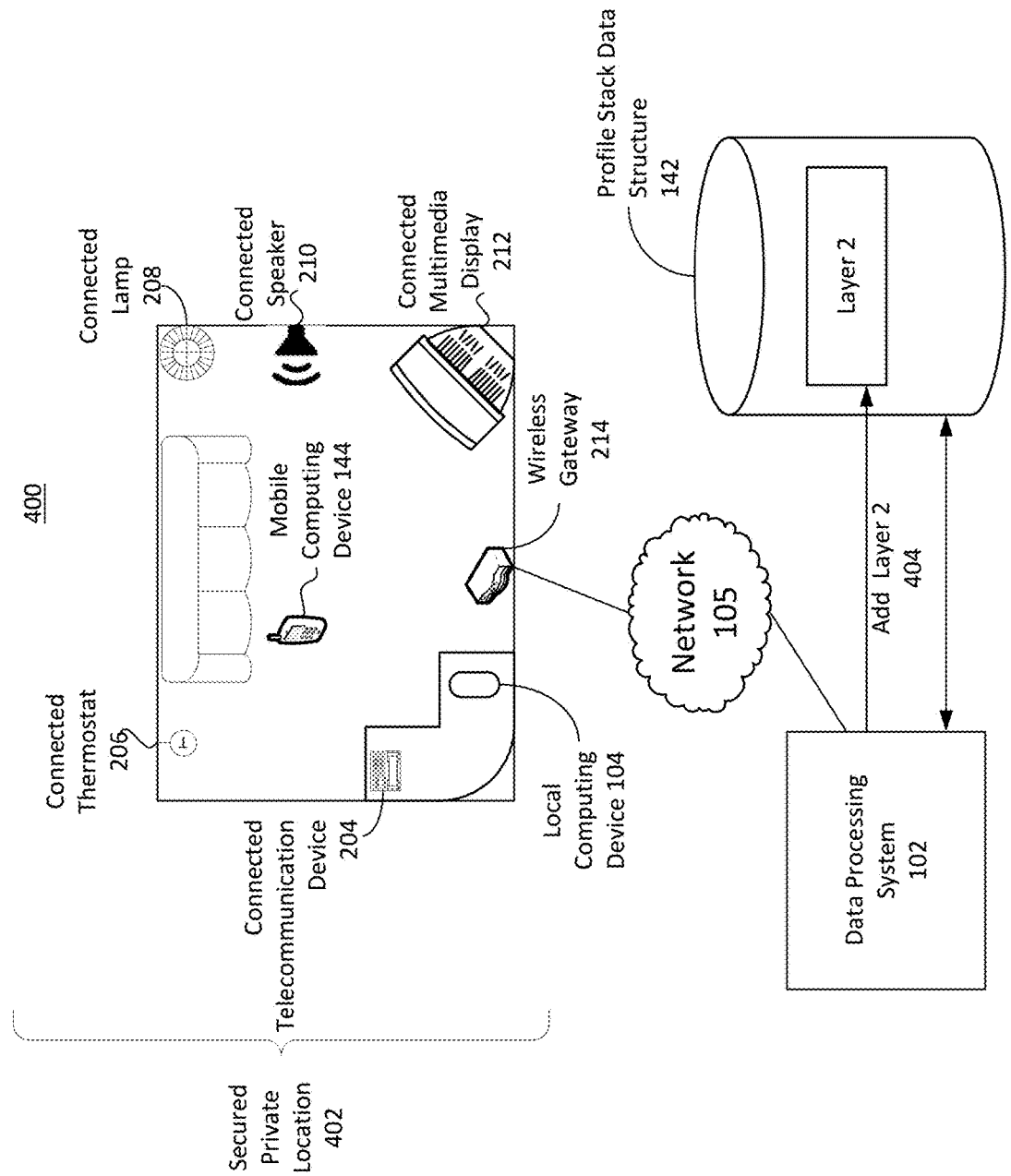
FIG. 4 is an illustration of an operation of a system to process stacked data structures via a computer network.

FIG. 4 is an illustration of the operation of system 100 to process a profile stack. The system 100 can operate in an environment 400 can include one or more component of system 100 depicted in FIG. 1, or system 700 depicted in FIG. 7. The environment 400 can include a secured private location 402, such as a private residence corresponding to the user associated with the electronic account with the acoustic signature associated with the second profile. The secured private location 402 can include several internet connected devices that can be managed, monitored, or controlled by data processing system 102. The internet connected devices can include, for example, a connected telecommunication device 204, connected thermostat 206, connected lamp 208, connected speaker 210, and connected multimedia display 212. The secured private location 402 can also include a local computing device 104. The local computing device can include one or more component or functionality as local computing device 104. The secured private location 402 can also include a wireless gateway 214, which can include one or more component or functionality as wireless gateway 214 located in the public location 202 depicted in FIG. 2.

The connected telecommunication device 204 located in the secured private location 402 can include one or more component or functionality as the connected telecommunication device 204 located in the public location 202 depicted in FIG. 2. However, the connected telecommunication device 204 located in the secured private location 402 can include different configuration settings or identifiers as compared to the connected telecommunication device 204 located in the public location 202 depicted in FIG. 2.

The connected thermostat 206 located in the secured private location 402 can include one or more component or functionality as the connected thermostat 206 located in the public location 202 depicted in FIG. 2. However, the connected thermostat 206 located in the secured private location 402 can include different configuration settings or identifiers as compared to the connected thermostat 206 located in the public location 202 depicted in FIG. 2.

The connected lamp 208 located in the secured private location 402 can include one or more component or functionality as the connected lamp 208 located in the public location 202 depicted in FIG. 2. However, the connected lamp 208 located in the secured private location 402 can include different configuration settings or identifiers as compared to the connected lamp 208 located in the public location 202 depicted in FIG. 2.

The connected speaker 210 located in the secured private location 402 can include one or more component or functionality as the connected speaker 210 located in the public location 202 depicted in FIG. 2. However, the connected speaker 210 located in the secured private location 402 can include different configuration settings or identifiers as compared to the connected speaker 210 located in the public location 202 depicted in FIG. 2.

The connected multimedia display 212 located in the secured private location 402 can include one or more component or functionality as the connected multimedia display 212 located in the public location 202 depicted in FIG. 2. However, the connected multimedia display 212 located in the secured private location 402 can include different configuration settings or identifiers as compared to the connected multimedia display 212 located in the public location 202 depicted in FIG. 2.

The secured private location 402 can refer to a private residence, home or apartment of the user. The local computing device 104 in the secured private location 402 may not utilize a default or baseline profile provided by a third-party device 146. Thus, the data processing system 102 can add only a Layer 2 profile associated with the second user's electronic account. The profile stack data structure 142 (which can include one or more component or functionality of profile stack data structure 142) for the local computing device 104 located at the secured private location 402 may not include a Layer 1 profile established by a third-party device. Thus, the data processing system 102 can only add Layer 2 404 to the profile stack data structure 142.

However, should a second user enter the secured private location 402 and provide a voice input that is detected by the local computing device 104, the data processing system 102 can select a third profile corresponding to the second user, and then push the third profile to the profile stack data structure 142 as a Layer 3 (where there is no Layer 1 depicted to illustrate a layering structure consistent with profile stack data structure 142).

In some cases, the local computing device 104 and the data processing system 102 in the secured private location 402 can push one or more additional profile layers on to the profile stack data structure 142. For example, a guest at the secure private location 402 can provide voice input that can be detected by the local computing device 104. The local computing device 104, upon detecting the voice input or input audio signal, can perform pre-processing on the input audio signal and transmit data packets corresponding to the input audio signal to the data processing system 102 for further processing. The data processing system 102 can attempt to detect an acoustic signature from the input audio signal. The data processing system 102 may identify the acoustic signature and then attempt to identify a corresponding electronic account for the guest. However, the data processing system 102 may not be able to identify a corresponding electronic account for the guest—or the data processing system 102 may not be able to identify an acoustic signature. In either case, the data processing system 102 may not have access to or be able to select a profile layer responsive to the input audio signal or acoustic signature thereof. In this case, the data processing system 102 can utilize a separate processing flow.

For example, a guest user that provided the input audio signal may not have an electronic account or profile established with the data processing system 102. The guest may have a mobile computing device 144. The data processing system 102 can determine the absence of the electronic account corresponding to the input audio signal. In some cases, the data processing system 102 can generate a prompt or request to create a new profile. However, if the guest user rejects the prompt or request to create a new profile, or in the event the data processing system 102 determines to proceed with the processing flow without creating a profile, the data processing system 102 can initiate a profile-less flow or enter a guest-mode. In the guest-mode, the data processing system 102 can utilize separate authentication mechanism. For example, the data processing system 102 can, via a display device coupled to the local computing device 104, present an optic code such as a QR code (or some other code, such as a unique identifier of an account, identifier or a financial instrument). The unique identifier or QR code can allow the guest to establish a temporary session that does not result in the creation of a profile or an electronic account.

The data processing system 102 can proceed with constructing an action data structure or performing other tasks via the temporary session.

In some cases, the data processing system 102 may transmit a digital component to purchase a product, such as the local computing device 104 itself, to the mobile computing device 144 of the guest.

Figure 5:
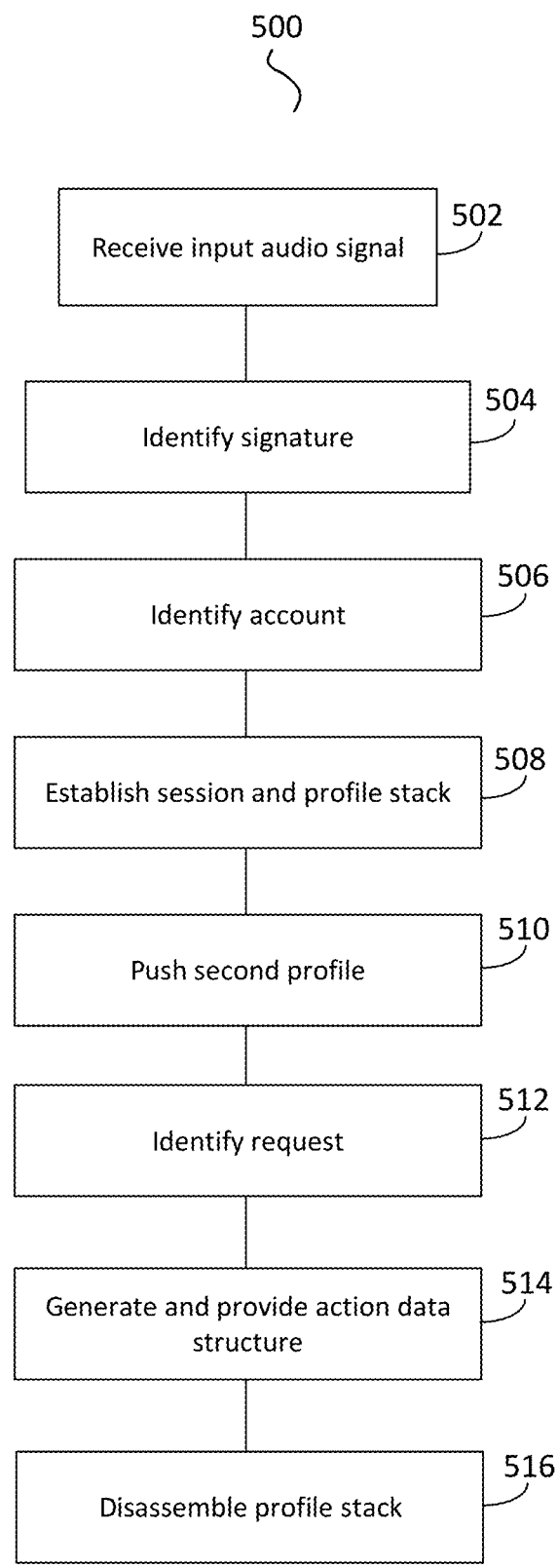
FIG. 5 is an illustration of a method of processing stacked data structures via a computer network.

FIG. 5 is an illustration of a method of processing stacked data structures via a computer network. The method 500 can be performed by one or more component, system or element of system 100 depicted in FIG. 1, or system 700 depicted in FIG. 7. The method 500 can be performed in environment 200 depicted in FIG. 2, environment 300 depicted in FIG. 3, or environment 400 depicted in FIG. 4. The method 500 can include a data processing system receiving an input audio signal at ACT 502. The data processing system receive the data packets including the input audio signal via an interface. The input audio signal may have been detected by a sensor of a local computing device, such as a microphone. The local computing device may be located in a public location, such as a hotel. In some cases, the local computing device may be located in a secure, private location, such as a residence. The local computing device can detect voice input, pre-process the voice input, generate data packets comprising at least some of the voice input, and transmit the data packets to the data processing system. The local computing device may transmit the data packets responsive to identifying a trigger keyword that indicates to the local computing device to detect the voice input, convert it to digital data packets, and transmit the digital data packets to the data processing system for further processing.

At ACT 504, the data processing system identifies a signature. The data processing system can identify an acoustic signature from the input audio signal. The data processing system can apply speaker recognition techniques, pattern recognition or other techniques to identify the acoustic signature. The data processing system can identify one or more acoustic signatures. In some cases, the data processing system can prompt the user for multi-factor authentication, such as via a passcode, password, pin, passphrase, other biometric authentication, or security code transmitted to a mobile device.

At ACT 506, the data processing system identifies an account. The data processing system can perform a lookup in a data repository sing the acoustic signature to identify an electronic account. The data processing system can perform the lookup responsive to authentication based on the acoustic signature, or multi-factor authentication being satisfied. The electronic account can include profile information, such as preferences, labels, policies, rules, or other information that can reduce erroneous or wasted remote procedure calls, or data transmissions.

In some cases, the data processing system can identify the account without using the acoustic signature. The data processing system can identify the account using various input, sensors, or interfaces. For example, rather than use the acoustic signature to identify the account, the data processing system can identify the account based on a mobile device in the possession of the user. The mobile device can communicate or interact with the local computing device. The user can log into mobile device using the account. Logging into the mobile device using the account can refer to inputting credentials such as a username (or other account identifier) and password (or other token, key or biometric password) into a software application or operating system executing on the mobile device, and authenticating the credentials. The mobile device can communicate the account information (e.g., username) to the local computing device and indicate that the account has been authenticated on the mobile device. The local computing device can transmit, to the data processing system, an indication of the account identifier and that the account identifier has been authenticated or validated. The data processing system can receive the account identifier from the local computing device, access the corresponding electronic account, and retrieve the corresponding profile. Thus, the data processing system can identify an account associated with the user using one or more techniques that may or may not include using an acoustic signature. Other techniques can include using an optical code (e.g., a quick reference code), biometric (e.g., fingerprint, iris scanner, or facial recognition), using a keyboard, mouse or touch interface to type an account identifier, or using voice input to provide the account identifier.

At ACT 508, the data processing system establishes a session and a profile stack. The data processing system can establish a session and a profile stack data structure for use in the session. The data processing system can establish the session and profile stack data structure responsive to identification of the electronic account or completion of an authentication procedure (e.g., acoustic signature-based authentication, or multi-factor authentication, or additional biometric authentication). Since the profile stack data structure can be for the local computing device located in the public location maintained by a third-party, the profile stack data structure can include a first profile layer having one or more policies configured by a device of the third-party entity (e.g., hotel administrator, mall administrator, or rental car administrator).

At ACT 510, the data processing system pushes a second profile. The data processing system can push the second profile as a second profile layer onto the profile stack data structure that is established for the session. The first profile layer may have certain labels or policies that take priority over the second profile layer. While the second profile layer may be utilized to select digital components and generate action data structures, the first profile layer can block certain types of digital components or action data structure from being executed (e.g., delivered for presentation to the user, transmitted to the intended internet connected device, or transmitted to a service provider such as a ride sharing service).

At ACT 512, the data processing system identifies a request. The data processing system can parse the input audio signal to identify a request and a trigger keyword corresponding to the request. The data processing system can parse the same input audio signal used to identify the acoustic signature, electronic account, and second profile. In some cases, the data processing system may process a second input audio signal received subsequent to the first input audio signal used to identify the electronic account and profile. The data processing system may identify the request and trigger keyword in the second input audio signal.

At ACT 514, the data processing system generates and provides an action data structure. The data processing system can generate the action data structure based on the request, trigger keyword and the second profile layer pushed to the profile stack data structure. The action data structure can be generated responsive to the request. The action data structure can be compatible with the first profile layer of the profile stack data structure. While the action data structure can be generated using the second profile associated with the electronic account associated with the acoustic signature, the data processing system can perform an error check to determine whether the generated action data structure is compatible or compliant with the first profile layer. For example, the first profile layer may block, prevent, or prohibit certain types of action data structures that may be erroneous, or consume excessive network bandwidth or computing resources.

Upon determining that the action data structure is compliant with the first profile layer, the data processing system can provide the first action data structure for execution. Providing the action data structure for execution can include transmitting the action data structure to an internet connected device to perform the action or provide the instruction; transmitting the action data structure to a service provider; or providing the action data structure to a content selector component to receive a digital component.

At ACT 516, the data processing system disassembles the profile stack 514. The data processing system can disassemble the profile stack responsive to detection of a trigger event. The data processing system can disassemble the profile stack data structure by removing one of the first profile layer or the second profile layer from the profile stack data structure. For example, the data processing system can reset the profile stack to the default setting by removing the second profile corresponding to the acoustic signature. The trigger event can include a time interval (e.g., a custom time interval set by the user, or a predetermined time interval such as 10 minutes, 20 minutes, 30 minutes, 1 hour, 12 hours, or 24 hours). The trigger event can include geographic fence, or detection of a second user different from the first user.

By using the profile stack data structure, the data processing system can facilitate disambiguating commands received by the local computing device. For example, the data processing system can receive a command with a grammar "lights at home". The data processing system can check the second profile to identify the one or more internet connected devices corresponding to "lights at home". However, the first profile layer can also include a label corresponding to "lights at home". The data processing system can provide a prompt to the user to decipher which internet connected device are to be controlled. For example, the data processing system can generate an action data structure based on the second profile, and then compare the action data structure with a policy or rule in the first profile to determine whether the generated action data structure is compliant with the first profile. In some cases, the data processing system can determine the action data structure is not compliant because the label overlaps with a label in the first profile, and, accordingly, block transmission or execution of the action data structure without a further prompt.

Figure 6:
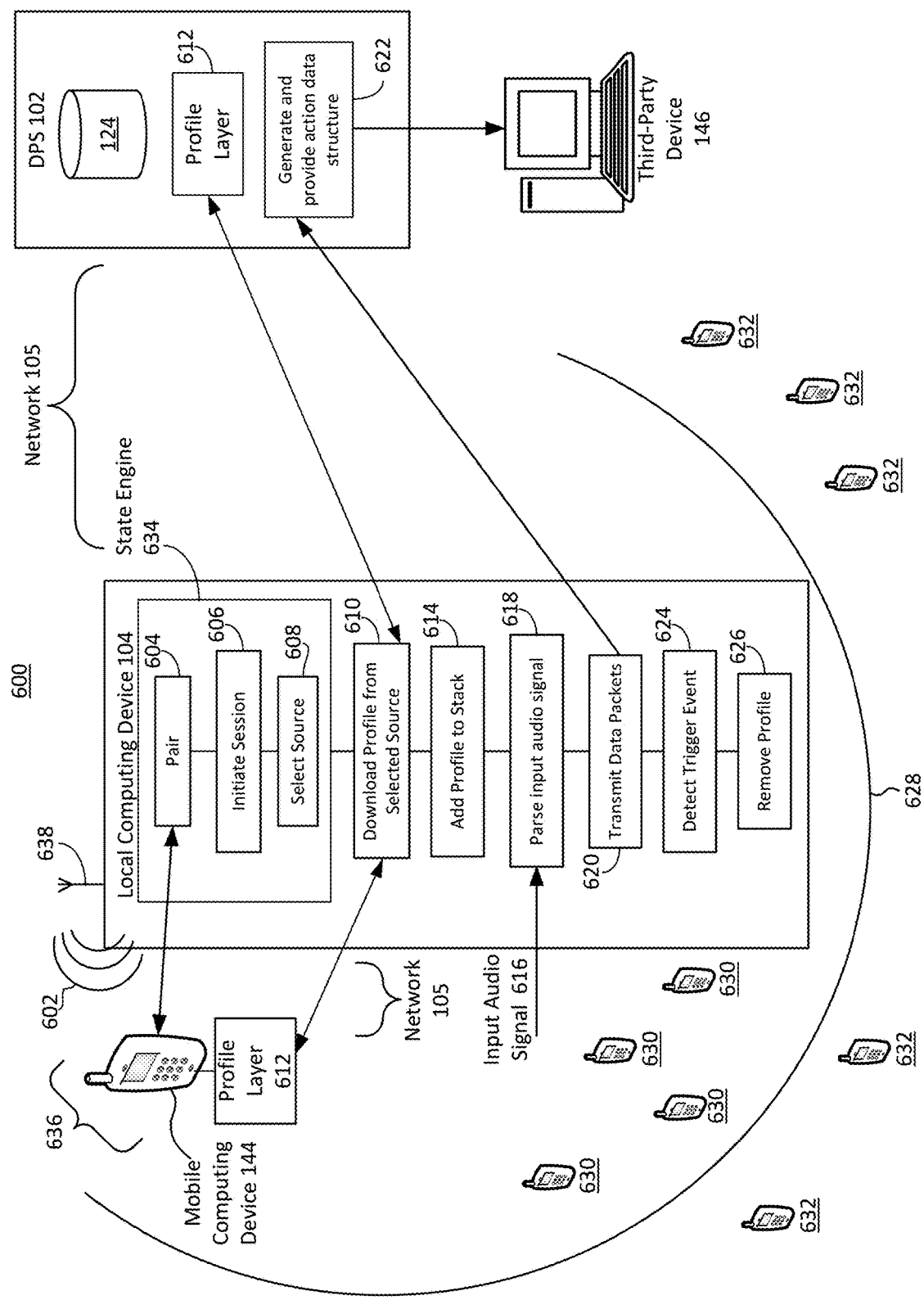
FIG. 6 is an illustration of an operation of a system to process stacked data structures via a computer network.

FIG. 6 is an illustration of an operation of a system to process stacked data structures via a computer network. In a local computing device (e.g., 104) that operates in a voice-based input/output computing environment, there may be friction between multiple profiles or accounts. For example, there may be a limited number of accounts that can be linked to a local computing device 104 due to the limited amount of physical memory or storage available on the local computing device 104. Further, it may be challenging to select or identify the correct profile to use if there are a large number of available profiles from which to select. For example, it may be challenging for a local computing device 104 to select the profile to use from a large set of profiles due to a limited amount of variation between the different acoustic signatures of each profile. If the an acoustic signature is not readily distinguishable from at least one other acoustic signature, then it may be challenging for the local computing device 104 or data processing system 102 to select the correct corresponding account or profile to use to process the input signal or other data packets.

Systems and methods of the present technical solution allow a local computing device or data processing system to efficiently identify the correct profile or account without storing a large number of profiles or accounts on the local computing device. Further, the present technical solution can reduce memory and computational resource consumption by select the profile to use from a limited set of candidate profiles, and then removing the profile from storage or the stack responsive to a termination event.

For example, the system can identify other client computing devices (e.g., mobile computing devices 144) that are in proximity with the local computing device 104. The system can pair with the identified client computing device 144. For example, the local computing device 104 can pair with the mobile computing device 144. The data processing system 102 can pair with the mobile computing device 144. The data processing system 102 can pair with the mobile computing device 144 via the local computing device 104. A user of the mobile computing device 144 can confirm or agree to the pairing. Upon pairing the mobile computing device 144 with the local computing device 104 or the data processing system 102, a profile layer corresponding to an electronic account associated with the mobile computing device 144 can be transferred and added to the profile stack data structure established for the session. The profile layer can be transferred from the mobile computing device 144 to the local computing device 104, or from the data processing system 102 to the local computing device 104. The profile layer can be transferred from the mobile computing device 144 to the data processing system 102. The profile layer can be transferred from the mobile computing device 144 to the local computing device 104, and from the local computing device 104 to the data processing system 102. When the session ends, the profile layer can be removed.

For example, it can be challenging for a digital voice assistant to add or onboard new profiles or users, including linking accounts and setting up voice recognition, because it is tedious, processor intensive, memory intensive, and time consuming. Furthermore, it may be required to set up accounts on each new digital assistant platform, further creating inefficiencies and friction. Digital assistant devices, such as a local computing device 104, can have a limit to the number of accounts it can support at a time (e.g., 1, 2, 3, 4, 5, 6, 7, or 8). For example, the issues can range from the digital assistant on mobile computing devices only recognizing a primary account holder, to challenges in bringing the digital assistant to a public communal space where multiple users are to be recognized ephemerally. Thus, the present technical solution can provide technical improvements and solutions that allow for efficiently expanding the capabilities of the digital assistant platform or digital assistant device to allow it to operate in expanded scenarios, such as public spaces.

For example, digital assistant platforms are being installed, positioned, or established in rental spaces such as hotel rooms, or larger-scale spaces such as conferences, airports, classrooms, museums, hospitals, retail stores, restaurants, or grocery stores. As new users are transition to and from different digital assistant devices, the present technical solution allows for recognizing temporary new users on a large scale. The present technical solution an provide a quick onboarding process with each new digital assistant device. For example, the improved onboarding process may allow the bypassing of a tedious account setup, or mistaken or unrecognized identity.

Onboarding can be technically challenging due to voice match. Voice match can refer to or include a feature that trains the digital assistant device to recognize a specific phrase, such as a hotword (or wake word). For example, when setting up voice match on a digital assistant device, a user of the digital assistant device can repeat the phrase "Wakeup Digital Assistant" one or more times. Once the digital voice assistant device sets the voice profile based on this repeated phrase, the digital voice assistant device can link the invoker (e.g., the user who said "Wakeup Digital Assistant") to the corresponding electronic account. If a public digital assistant device has too many possible accounts, then it will be challenging for the voice recognition component of the digital assistant device to distinguish or discern one user from another because of the overlapping acoustic signatures in the voice profiles. To reduce the number of accounts from which to select, the digital assistant device can reduce the number of stored accounts from which it is to distinguish. However, if there are a limited number of accounts linked to the hotword only, then words spoken after the invocation may not be recognized by voice match. For example, if a first user invokes the digital assistant device and a second user, "who am I?", the digital assistant device can return the response saying that it is the first user. The systems and methods of the present technical solution allow for linking the voice to the user through device techniques (e.g., pairing, location, or calendar technology) in addition to just the hotword, which can increase the likelihood the digital assistant device identifies and parses the user accurately when the user is speaking to the digital assistant device in a noisy public space. Thus, systems and methods of the present technical solution can provide a smoother or frictionless onboarding (and offboarding) process, that increases the accuracy of identify an electronic account or profile layer to use to process the input audio signal or data packets in large-scale public spaces.

Thus, systems and methods of the present technical solution provide a state engine or state mechanism that automatically enables account engaged states based on device proximity or calendar technology, and then uses this engaged state to supply one or more user voice profiles for the purposes of detecting which user gave a command and giving personalized results. This technical solution can improve the technical performance of digital assistant devices that are configured for use in shared or public spaces, such as digital assistant devices having guest users, a personal device that is being shared (such as a smartphone), or a public device such as one in a hotel room or other public space. The systems and methods of the technical solution can allow a user to bypass a sign-on flow with the digital assistant device and still have the correct electronic account and profile layer be established for use in a session with the digital assistant device. A sign-on flow can be cumbersome and inorganic, so by entirely skipping or bypassing the sign-on flow, the systems and methods of the present technical solution can provide a more seamless and efficient user experience.

Further, the present technical solution can mitigate or resolve issues arising due to a predetermined limit of accounts that can be signed into a digital assistant device. For example, by avoiding the sign-on flow which can result in an electronic account signed into the device in a persistent fashion, the systems and methods of the technical solution can allow a profile layer to be attributed to a specific ephemeral session so that responsive to a termination event or trigger event, the profile layer can be removed from a the digital assistant device.

For example, a mobile computing device can come into proximity with a shared digital assistant device. At this point the mobile computing device can be paired with the digital assistant device. This pairing can be accomplished through one or more pairing techniques, such as pairing via WIFI, short range wireless communication such as BLUETOOTH, or subaudible acoustic sound).

The pairing process can be completed using one or more techniques. Pairing can be completed using voice commands, button presses, inputs, or inputting a code into the mobile computing device that is provided by the digital assistant device. Pairing can be completed using a concentrated signal that detects that the mobile computing device is located at a certain location relative to the digital assistant device. For example, the concentrated signal (e.g., optical signal, laser, acoustic signal, subaudible acoustic signal) can be detected by the digital assistant device or the mobile computing device. The digital assistant device can include a directional antenna that picks up signals that are broadcast from a position or spot directly in front of the digital assistant device (or some other predetermined or desired position). The digital assistant device can use a directional antenna to broadcast a signal that is detectable by mobile computing device while in front of the digital assistant device (or beside or other predetermined or desired position relative to the digital assistant device). The digital assistant device or mobile computing device can utilize beacon technologies having a short range that can be used to detect when the mobile device is in the predetermined or desired position. Other pairing techniques can include, for example, a tap and connect mechanism similar. The tap and connect mechanism can refer to or include bringing the mobile computing device into very near proximity with a portion of the digital assistant computing device (e.g., touching the digital assistant device or dedicated portion thereof with the mobile computing device or bringing it to within 3 inches, 4 inches, 5 inches, 6 inches, 7 inches, for example). Once the digital assistant device detects the proximity and the mobile computing device detects the proximity, a prompt can be provided and a user can input an indication to complete the pairing.

Upon or responsive to pairing being completed between the mobile computing device and the digital assistant device, the mobile computing device can transfer a voice profile or profile layer to the digital assistant device. The digital assistant device can establish the profile layer for the session. Thereafter, the digital assistant device can process or parse input audio signals in accordance with one or more policies of the profile layer.

When the mobile computing device moves away from the digital assistant device (or the digital assistant device moves away from the mobile computing device or a termination event is otherwise detected), the connection or session between the digital assistant device can be terminated or ended, and the profile layer can be removed from the digital assistant device. To mitigate having to re-pair with the digital assistant device every time the mobile computing device moves out of range and then comes back within range (e.g., if the user is staying in the hotel room for several days and enters and leaves the hotel room several times during the course of the visit), the digital assistant device can maintain a cache for recently (e.g., within 5 minutes, 10 minutes, 30 minutes, 1 hour, 2 hours, 3 hours, 4 hours, 6 hours, 12 hours) paired devices.

The digital assistant device, or the digital assistant device in communication with a data processing system, can use calendar technology for to temporarily hold or maintain profile layers for an extended duration. For example, the digital assistant device can use the calendar information to determine the length of a hotel stay, and store the profile layer for the duration of the stay (e.g., temporary pairing can be done at the beginning of the stay and removed from the device at the end of the stay, where the length of the stay is indicated by a calendar event).

Thus, systems and methods of the present technical solution can improve voice recognition of the digital assistant device by providing a short or filtered list from which to choose. For example, a digital assistant device might be accessible to 200 mobile computing devices or users thereof. If any single user walks up and begins speaking, the voice recognition may have an increased likelihood of mis-recognizing the user as the wrong user from the list of 200. However, with the present technical solution, the digital assistant device can identify which mobile computing device or user thereof is close by, which can filter the list of 200 potential users down to 5, for example, thereby increasing the likelihood that the voice recognition component of the digital assistant device can more perform voice-recognition.

With a short list of available users that is greater than 1, the digital assistant device can correctly identify multiple users at the same time and deliver personalized results. The user voice profile currently only voice matches against the wake up phrases like "Wake up assistant". However, the systems and methods of the present can build a voice profile from additional input audio signals, taking into account pronunciation and phrase building to deliver more accurate personal results. The system can then voice match against input audio signals in addition to the wakeup call. For example, if two profiles (A and B) are signed-in at the same time (as separate accounts or with two voice profiles for one account) and user A says "wake up assistant" and wakes up the digital assistant device, but user B asks the assistant to play their favorite song, the digital assistant will correctly play user B's favorite song even though it was invoked by user A.

Further, the systems and methods of the present technical solution can facilitate preventing abuse because the digital assistant device can identify the profile corresponding to the input audio signal regardless of the profile associated with the wakeup call that invoked the digital assistant device, thereby preventing fraudulent or malicious activity.

Still referring to FIG. 6, and in further detail, the system 600 can include a data processing system 102. The system 600 can include a local computing device 104. The local computing device 104 can include or refer to a digital assistant device. The data processing system 102 or local computing device 104 can interface with, interact with, or otherwise communicate with a mobile computing device 144.

The local computing device 104 (or digital assistant device) can be located in a public space, such as secured public location 202 depicted in FIG. 2, or an unsecured public location 302 depicted in FIG. 3, or a secured private location 402 depicted in FIG. 4. The local computing device 104 can utilize network 105 to communicate with the data processing system 102 or mobile computing device 144.

In the environment 600, there may be one or more mobile computing device 144. For example, mobile computing device 144 can be a first mobile computing device. Further, there may be one or more other mobile computing devices 630 or other mobile computing devices 632. The other mobile computing devices 630 and 632 can include one or more component or functionality as mobile computing device 144. However, other mobile computing devices 630 can be located within range 628 of the local computing device 104 (or digital assistant device), while other mobile computing devices 632 can be located outside of range 628 of the local computing device 104. The range 628 can be defined by a radius around the local computing device 104. The range 628 can be defined by a signal strength threshold. The range 628 can be defined by a geographical distance, or other boundary. For example, the range 628 can be defined as a particular building, structure, room, or other area. The range 628 can be defined as a signal strength range or amount of distance a type of communication is operable to communicate.

The local computing device 104 can include an antenna 638 to broadcast a signal at ACT 602. The antenna 638 can be a directional antenna or beam antenna. The antenna 638 can be a highly directional antenna. A directional antenna or beam antenna can refer to or include an antenna that radiates or receives greater power in specific directions allowing increased performance and reduced interference from unwanted sources. A directional antenna can provide increased performance relative to, for example, dipole antennas or omnidirectional antennas when a greater concentration of radiation in a certain direction is desired. The antenna 638 can in include a high-gain antenna, which can be a directional antenna with a focused, narrow radiowave beam width. This narrow beam width can allow more precise targeting of the radio signals. When transmitting, a directional antenna or high-gain antenna allows more of the transmitted power to be sent in the direction of the receiver (e.g., a receiver antenna on the mobile computing device 144), increasing the received signal strength. When receiving, a high gain antenna captures more of the signal, again increasing signal strength. Due to reciprocity, an antenna that makes a transmitted signal 100 times stronger (compared to an isotropic radiator) can also capture 100 times as much energy as the isotropic antenna when used as a receiving antenna. As a consequence of their directivity, directional antennas also send less (and receive less) signal from directions other than the main beam, thereby reducing interference. Example directional or high-gain antennas can in include parabolic antennas, helical antennas, yagi antennas, phased arrays of smaller antennas of any kind, or horn antennas constructed with high gain.

The mobile computing device 144 can be positioned at location 636. Location 636 can be directly in front of the local computing device 104, directly beside the local computing device 104, or other location 636 that is desired for pairing with the local computing device 104. For example, location 636 can be directly adjacent to or near the antenna 838.

At ACT 602, the local computing device 638 can provide an electrical signal to antenna 638 to cause a broadcast of the signal. The broadcast can refer to or include a beacon. The broadcast can be detected by mobile computing device 144. The broadcast or transmitted signal at ACT 602 can include data or instructions to cause an application executing on the mobile computing device 144 to generate a prompt or notification. The mobile computing device 144 can render the prompt or notification on a display device of the mobile computing device 144. The broadcast can be based on a wireless communication protocol. The broadcast can be a short range wireless communication. The broadcast can be over WIFI. The broadcast can be over network 105, or type of network.

The local computing device 104 (or data processing system 102) can include, interface with, or otherwise execute a state engine 634 designed and constructed to automatically enter an engaged state with an account corresponding to the mobile computing device 144 based on device proximity or calendar technology, and then use this engaged state to process or parse data packets to facilitate the generation of action data structures responsive to a request.

For example, responsive to the broadcast of pairing signal by the antenna 638 at ACT 602, the state engine 634 can receive, from the mobile computing device 144 associated with an electronic account, a request to pair with the local computing device 104. The state engine 634 can pair with the mobile computing device 144.

The state engine 634 can include one or more processors, memory, scripts, circuitry or other components or functionality. The state engine 634 can interface with one or more other systems, such as a data processing system 102, calendar system, or hotel check-in/check-out system to facilitate pairing. For example, the state engine 104, in communication with data processing system 102, can identify a location entry stored in a calendar event in the electronic account of the mobile computing device. For example, the electronic account associated with the mobile computing device 144 can include or be linked with an electronic calendar. The electronic calendar can include one or more data structures storing event entries. Each data structure or each event entry can include one or more fields. At least one of the fields, for example, can include location information or a location entry. At least one of the fields, for example, can include time or date information. The state engine 634 can determine the location entry is within a threshold distance or range 628 from the local computing device 104. The local computing device 104, responsive to determining that the mobile computing device 144 is within range 628, can command the local computing device 104 to transmit a request to pair (e.g., broadcast transmitted at ACT 602) with a mobile computing device 144 linked to the electronic account. Electronic accounts and calendar data structures can be stored in data processing system 102, such as in a data repository 124 of data processing system 102.

At ACT 604, the mobile computing device 144 can pair with the local computing device 104. Pairing can refer to or include a handshaking process between the mobile computing device 144 and the local computing device 104. The pairing process can refer to or include an authentication or authorization process. Pairing can refer to or include a code being input to the local computing device 104 or the mobile computing device 144. Pairing can refer to or include receiving an indication to connect with the local computing device 104. Pairing can refer to or include establishing a connection (wireless connection or symbolic connection) between the mobile computing device 144 and the local computing device 104.

At ACT 606, the state engine 634 can initiate a session with the mobile computing device 144. Initiating a session can include or refer to, for example, linking an electronic account or profile with the local computing device 104, or beginning the process of linking the electronic account or profile. Initiating the session can include, for example, establishing a duration for the session, establishing an end time or termination time for the session. Initiating the session can include setting a termination event or termination trigger or trigger event for the session. Termination events or triggers can include, for example, geofence based event, such as the mobile computing device 144 moving from within range 628 to outside range 628. Termination events can be set based on calendar event entry information, such as the end of a stay at a hotel as determined by calendar information. The local computing device 104, or data processing system 102, can access a hotel check-in/check-out system to determine the duration of stay at a hotel.

The local computing device 104 can establish the session with a profile stack data structure for use in the session. The local computing device 104 can establish the profile stack data structure with a default, baseline, or predetermined profile layer, such as a default or first profile layer. The default profile layer can include one or more policies. The default profile layer can be set or established or configured by the administrator of an entity associated with the location of the local computing device 104, such as an owner or proprietor of the hotel, public space, restaurant, or mall.

At ACT 608, the state engine 634 can select a source. Selecting a source can refer to the state engine 634 or local computing device 104 determining from which device or system to download or retrieve or request information associated with the paired mobile computing device 144. For example, the electronic account can include a profile layer. The profile layer can include or refer to one or more policies associated with the electronic account. The profile layer can include or refer to a voice profile. The voice profile can be used to perform voice match or voice recognition.

The local computing device 104 can determine whether to download the profile layer from the mobile computing device 144 or the data processing system 102 based on a policy, network characteristics, security, or other factors or parameters. For example, the profile layer may be a data file that can have a file size. The file size of the profile layer can be such that transmitting the data file over network 105 can take a certain amount of time. The local computing device 104 can analyze the network characteristics between the local computing device 104 and the mobile computing device 104. The profile layer can also be stored in data repository 124 on the data processing system 102. Accordingly, the local computing device 104 can also analyze or determine the network characteristics between the local computing device 104 and the data processing system 102. The local computing device 104 can determine from which of the mobile computing device 144 or data processing system 102 to download the profile layer. The local computing device 104 can select the source of the profile layer based on which source can provide the data file faster over the network 105.

For example, the local computing device 104 can pair with the mobile computing device 144 and identify an electronic account. The local computing device 104 or data processing system 102 can identify the electronic account by, for example, performing a lookup using a device identifier or other unique identifier associated with the mobile computing device 144. The device identifier can be linked to the electronic account in a map or index or other data file or data structure stored in a data repository. The local computing device 104 can determine a characteristic of a first network used to communicate with the data processing system 102. The first network can refer to the portion of network 105 or communication channel used to communicate between the local computing device 104 and the data processing system 102. The local computing device 104 can determine a characteristic of a second network used to communicate with the mobile computing device 144. The second network can refer to or include the portion of the network 105 or communication channel used to communicate between the mobile computing device 144 and the local computing device 104. The first and second networks can be a same type of network or different types of networks. The local computing device 104 can compare characteristics between the first and second networks to select one of the mobile computing device 144 or the data processing system 102 as a source of the profile layer. The local computing device 104 can download, from the selected source of the profile layer selected based on the comparison, the profile layer.

For example, the local computing device 104 can determine that a network speed between the local computing device 104 and the mobile computing device 144 is greater than the network speed between the local computing device 104 and the data processing system 102, and then determine to download the second profile layer from the mobile computing device 144.

The local computing device 104 can use one or more techniques or consider one or more factors when selecting the source of the profile layer. The local computing device 104 can determine factors such as security (e.g., which network is more secure based on encryption protocol or other security techniques), battery power (e.g., remaining battery power of the mobile computing device 144), memory, or account preferences.

At ACT 610, the local computing device 104 can download the profile layer 612 from the mobile computing 144 or the data processing system 102. The profile layer 612 can be stored on both the mobile computing device 144 and the data processing system 102. The data processing system 102 can synchronize the profile layer 612 between the mobile computing device 144 and the data processing system 102. In some cases, the profile layer 612 stored on one device can be updated and not yet synched with the other device. In such cases, the local computing device 104 can select the source of the profile layer 612 as the device containing the up-to-date profile layer 612.

The local computing device 104 can transmit a request to the selected source device for the profile layer 612. The selected source device can, responsive to the request, transmit the requested profile layer 612. The local computing device 104 can receive the profile layer 612. At ACT 614, the local computing device 104 can add the profile. The local computing device 104 can add, to a profile stack data structure established for the session, the profile layer associated with or retrieved from the electronic account. The second profile layer can be added by the stacking engine component 114, for example. The local computing device 104 can identify mobile computing device associated with the electronic account and receive an indication from the mobile computing device 144nto establish the profile stack data structure for use in the session. The local computing device 104 or data processing system 102 can then provide an indication that the second profile layer has been pushed or added to the profile stack data structure. The data processing system 102 can establish, responsive to the local computing device 104 pairing with the mobile computing device 144, the profile stack data structure with the second profile layer. The profile layer 612 stored on the mobile computing device 144 can include the second profile layer. The local computing device 104 can pair with the mobile computing device 144 corresponding to the electronic account receive the second profile layer from the mobile computing device 144.

Adding the second profile layer to the profile stack data structure can include adding one or more policies, rules, parameters from the second profile layer. For example, adding the second profile layer can include adding a wakeup call set in the second profile layer. The wakeup call can be set by a user of the mobile computing device 144 or electronic account. The local computing device 104 can wakeup based on the specific wakeup call set by the second profile layer.

At ACT 616, the local computing device 104 (or digital assistant device) can receive an input audio signal. The input audio signal can correspond to a user's voice. The input audio signal can include audible sounds, words, phrases, questions or requests, for example. The input audio signal can be detected by a microphone or other sensor of the local computing device 104. At ACT 618, the local computing device 104 can parse the input audio signal to identify. The local computing device 104 can generate data packets corresponding to the input audio signal. The local computing device 104 can convert the input audio signal to data packets. The local computing device 104 can detect a trigger keyword, hotword, or wakeup call in the input audio signal. For example, the input audio signal can include a trigger keyword, hotword or wakeup call.

The local computing device 104 can use the profile layer added to the profile stack at ACT 614 to parse or process the input audio signal. For example, the profile layer selected for the electronic account can include one or more policies that the local computing device 104 can use to process or parse the input audio signal, or generate actions based on the input audio signal. For example, the profile layer may include the trigger keyword, hotword, or wakeup call to identify in the input audio signal. The profile layer can facilitate voice recognition or natural language processing by the local computing device 104.

At ACT 620, the local computing device 104 can transmit the data packets to the data processing system 102 for further processing. The local computing device 104 can transmit the data packets with an indication of the electronic account or profile layer with which the input audio signal is associated. The local computing device 104 can transmit the data packets over network 105 to the data processing system 102.

At ACT 622, the data processing system 102 can process the data packets. The data processing system 102 can generate an action data structure based on the data packets. The data processing system 102 can use the profile stack data structure to generate the action data structure. The data processing system 102 can parse the data packets to identify one or more keywords, requests or trigger keywords, and generate the action data structure.

The data processing system 102 generate the action data structure responsive to the request. The data processing system 102 can generate the action data structure based on the second profile layer added to the profile stack data structure. The second profile layer can correspond to the profile layer retrieved from the mobile computing device 144 or the data processing system 102 and added to the profile stack data structure. The data processing system 102 can generate the action data structure based on the version of the second profile layer stored on the data processing system 102. The data processing system 102 can perform a lookup using an identifier, such as a device identifier or electronic account identifier, provided by the local computing device 104 along with the data packets.

The data processing system 102, upon generating the action data structure, can provide the action data structure to a third-party device 146 to execute the action data structure. The data processing system 102 can transmit instructions or commands corresponding to the action to the third-party device 146. The third-party device 146 can include an internet connect device. The third-party device 146 can include a service provider device, such as a ride share service provider.

At ACT 624, the local computing device 104 can detect a trigger event. The trigger event can be a termination event. The trigger event or termination event can be determined based on a mobile computing device 144 moving outside of the range 628. The trigger event or termination event can be set when the local computing device 104 established the session at ACT 606. The session can include the trigger event information, and at ACT 624 the local computing device 104 can detect the predetermined trigger event. The local computing device 104 or data processing system 102 can detect the trigger event based on location or calendar technology or information from another system. For example, the data processing system 102 or local computing device 104 can detect the termination event or determine to terminate the session based on an end session parameter set when the session was established, such as an end of stay or calendar event.

Responsive to detecting the termination event or trigger event, the local computing device 104 or data processing system 102 can remove the second profile layer from the profile stack data structure at ACT 626. The local computing device 104 can clear, delete, remove or purge the second profile layer from cache, memory or other storage on the local computing device 104.

Using calendar technology or information from another system, such as a hotel check-in/check-out session, the local computing device 104 can determine not remove the second profile layer based on a trigger event. For example, the local computing device 104 can detect an out of range trigger event, but then determine that the session is configured for an extended stay at a hotel, and block removal of the second profile layer until the session indicates the hotel stay is over. Thus, the state engine 634 of the local computing device 104 can override the out of range trigger event to cause the second profile layer to remain in cache, memory or storage of the local computing device 104 in order to facilitate re-pairing with the mobile computing device 144 or bypass pairing to reduce computation resource utilization.

Figure 7:
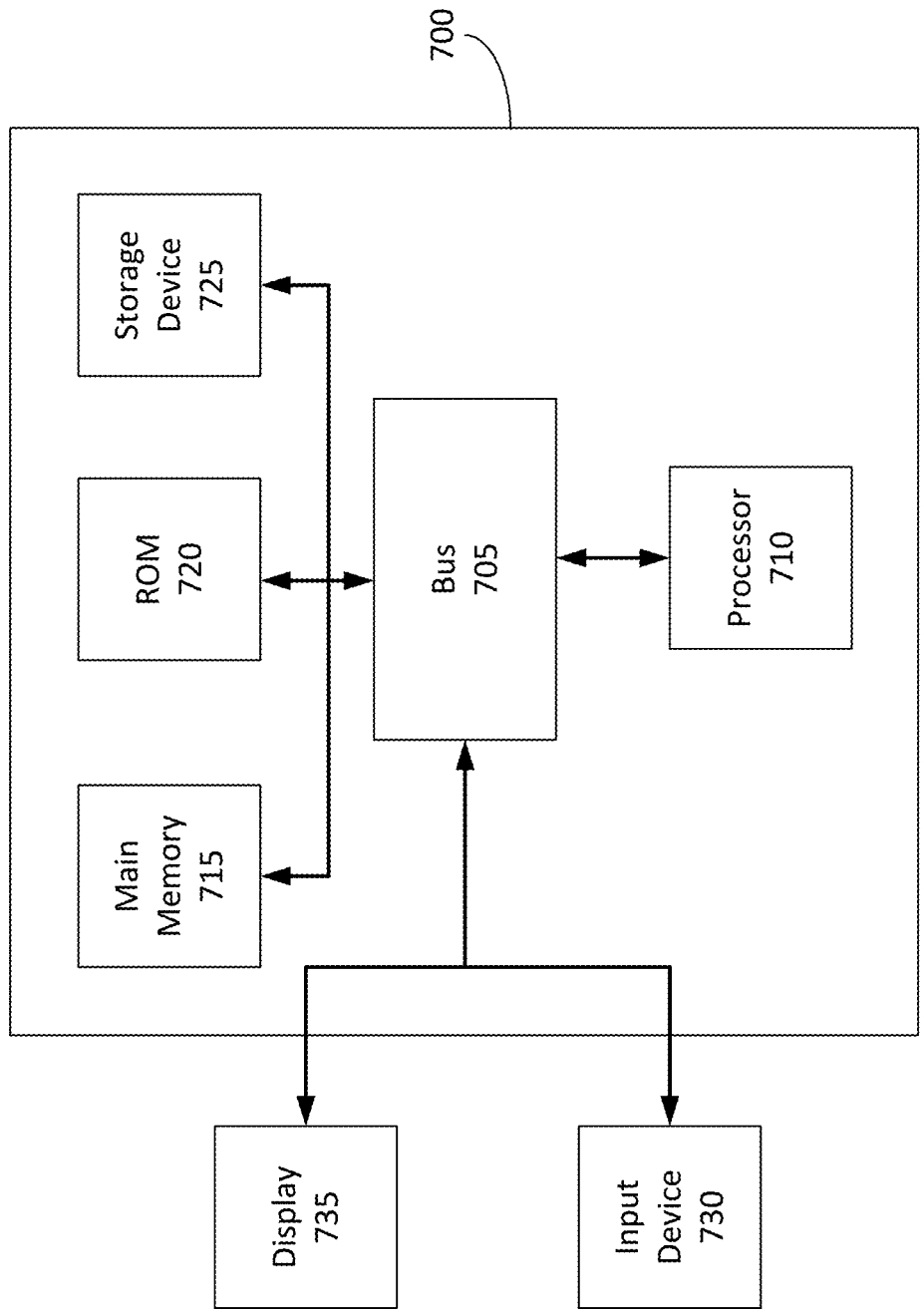
FIG. 7 is a block diagram illustrating a general architecture for a computer system that can be employed to implement elements of the systems and methods described and illustrated herein.

FIG. 7 is a block diagram of an example computer system 700. The computer system or computing device 700 can include or be used to implement the system 100, or its components such as the data processing system 102, or system 600 or its components such as the state engine 634. The data processing system 102 can include an intelligent personal assistant or voice-based digital assistant. The computing system 700 includes a bus 705 or other communication component for communicating information and a processor 710 or processing circuit coupled to the bus 705 for processing information. The computing system 700 can also include one or more processors 710 or processing circuits coupled to the bus for processing information. The computing system 700 also includes main memory 715, such as a random access memory (RAM) or other dynamic storage device, coupled to the bus 705 for storing information, and instructions to be executed by the processor 710. The main memory 715 can be or include the data repository 145. The main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions. The storage device 725 can include or be part of the data repository 145.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 can be part of the data processing system 102, the client computing device 150 or other component of FIG. 1, for example.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 116, content selector component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 700 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the local computing device 104 or the content provider computing device 106 or the third-party device 146).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to process stacked data structures, comprising:
   a data processing system comprising one or more processors and memory to execute a natural language processor component, an interface, a speaker recognition component, and a direct action application programming interface, the data processing system to:
   receive data packets comprising an input audio signal detected by a sensor of a local computing device;
   establish a session with a profile stack data structure for use in the session, the profile stack data structure comprising a first profile layer having one or more policies;
   identify, based on a lookup in a data repository, an electronic account corresponding to the data packets, the electronic account comprising a second profile layer;
   add, to the profile stack data structure established for the session, the second profile layer associated retrieved from the electronic account;
   parse the data packets to identify a request and a trigger keyword corresponding to the request;
   generate, based on the trigger keyword and the second profile layer added to the profile stack data structure, a first action data structure responsive to the request;
   provide the first action data structure for execution; and
   remove, responsive to detection of a trigger event, the second profile layer from the profile stack data structure.

2. The system of claim 1, comprising the local computing device to:
   identify a client computing device associated with the electronic account; and
   receive an indication from the client computing device to establish the profile stack data structure for use in the session; and
   provide an indication that the second profile layer has been pushed to the profile stack data structure.

3. The system of claim 1, comprising the local computing device to:
   broadcast a pairing signal;
   receive, from a client computing device associated with the electronic account, a request to pair with the local computing device;
   pair with the client computing device; and
   establish the profile stack data structure with the second profile layer responsive to pairing with the client computing device.

4. The system of claim 1, comprising:
   the local computing device to pair with a client computing device corresponding to the electronic account; and
   the data processing system to establish, responsive to the local computing device pairing with the client computing device, the profile stack data structure with the second profile layer.

5. The system of claim 1, comprising the data processing system to:
   identify a location entry stored in a calendar event in the electronic account;
   determine the location entry is within a threshold distance from the local computing device;
   command, responsive to the determination, the local computing device to transmit a request to pair with a client computing device linked to the electronic account; and
   push, responsive to the client computing device paired with the local computing device, the second profile layer to the profile stack data structure for use in the session.

6. The system of claim 1, comprising the local computing device to:
   pair with a client computing device corresponding to the electronic account; and receive the second profile layer from the client computing device.

7. The system of claim 1, comprising the local computing device to:
pair with a client computing device corresponding to the electronic account;
identify the electronic account based on a device identifier of the client computing device, the device identifier linked to the electronic account;
determine a characteristic of a first network used to communicate with the data processing system;
determine a characteristic of a second network used to communicate with the client computing device;
select, based on a comparison between the characteristic of the first network and the characteristic of the second network, one of the client computing device or the data processing system as a source of the second profile layer; and
download, from the source of the second profile layer selected based on the comparison, the second profile layer.

8. The system of claim 1, comprising the local computing device to:
pair with a client computing device corresponding to the electronic account;
determine that a network speed between the local computing device and the client computing device is greater than the network speed between the local computing device and the data processing system; and
receive, from the client computing device responsive to the determination, the second profile layer.

9. The system of claim 1, wherein the second profile layer comprises a voice profile for the electronic account.

10. The system of claim 1, comprising the local computing device to:
identify the trigger keyword based on the second profile layer pushed to the profile stack data structure.

11. The system of claim 1, the local computing device to:
add a wakeup call from the second profile layer.

12. The system of claim 1, comprising the data processing system to:
identify an acoustic signature from the input audio signal; and
identify the electronic account based on the acoustic signature.

13. The system of claim 1, comprising:
determine, based on the lookup, an absence of the electronic account;
create, responsive to the determination of the absence, the electronic account in the data repository; and
map the electronic account to an acoustic signature corresponding to the data packets.

14. The system of claim 1, wherein the first profile layer comprises labels for one or more internet connected devices.

15. The system of claim 1, comprising the data processing system to:
generate, based on the trigger keyword and the second profile layer pushed to the profile stack data structure, the first action data structure responsive to the request;
compare the first action data structure with the one or more policies of the first profile layer;
determine, based on a comparison of the first action data structure with the one or more policies of the first profile layer, that the first action data structure is compatible with the first profile layer; and
provide, responsive to the first action data structure determined to be compatible with the first profile layer, the first action data structure for execution.

16. The system of claim 1, comprising:
the data processing system to detect the trigger event based on a geographic fence.

17. A method of processing stacked data structures, comprising:
receiving, by one or more processors, data packets comprising an input audio signal detected by a sensor of a local computing device;
establishing, by the one or more processors, a session with a profile stack data structure for use in the session, the profile stack data structure comprising a first profile layer having one or more policies;
identifying, by the one or more processors based on a lookup in a data repository, an electronic account corresponding to the data packets, the electronic account comprising a second profile layer;
adding, by the one or more processors to the profile stack data structure established for the session, the second profile layer associated with the electronic account;
parsing, by the one or more processors, the input audio signal or the data packets to identify a request and a trigger keyword corresponding to the request;
generating, by the one or more processors based on the trigger keyword and the second profile layer pushed to the profile stack data structure, a first action data structure responsive to the request;
providing, by the one or more processors, the first action data structure for execution; and
removing, by the one or more processors responsive to detection of a trigger event, the second profile layer from the profile stack data structure.

18. The method of claim 17, comprising:
identifying a client computing device associated with the electronic account; and
receiving an indication from the client computing device to establish the profile stack data structure for use in the session; and
providing an indication that the second profile layer has been pushed to the profile stack data structure.

19. The method of claim 17, comprising:
broadcasting a pairing signal;
receiving, from a client computing device associated with the electronic account, a request to pair with the local computing device;
pairing with the client computing device; and
establishing the profile stack data structure with the second profile layer responsive to pairing with the client computing device.

20. The method of claim 17, comprising:
detecting the trigger event based on a geographic fence.

* * * * *